(12) United States Patent
Ramakrishna

(10) Patent No.: US 9,510,345 B2
(45) Date of Patent: Nov. 29, 2016

(54) SYSTEM AND METHOD FOR EFFICIENT INDICATION OF DISTRIBUTED SUB-BAND RESOURCES

(71) Applicant: Samsung Electronics Co., Ltd., Suwon-si, Gyeonggi-do (KR)

(72) Inventor: Sudhir Ramakrishna, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 492 days.

(21) Appl. No.: 13/873,162

(22) Filed: Apr. 29, 2013

(65) Prior Publication Data

US 2013/0250884 A1   Sep. 26, 2013

Related U.S. Application Data

(62) Division of application No. 12/855,533, filed on Aug. 12, 2010.

(60) Provisional application No. 61/275,425, filed on Aug. 28, 2009, provisional application No. 61/292,761, filed on Jan. 6, 2010.

(51) Int. Cl.
*H04W 72/04* (2009.01)
*H04L 5/00* (2006.01)

(52) U.S. Cl.
CPC ....... *H04W 72/044* (2013.01); *H04W 72/0453* (2013.01); *H04L 5/0007* (2013.01)

(58) Field of Classification Search
CPC ............ H04L 5/0007; H04W 72/044; H04W 72/0453

See application file for complete search history.

(56) References Cited

U.S. PATENT DOCUMENTS

| | | | |
|---|---|---|---|
| 6,173,162 B1 | 1/2001 | Dahlman et al. | |
| 6,359,923 B1 * | 3/2002 | Agee | H04B 1/69 370/342 |
| 6,532,227 B1 | 3/2003 | Leppisaari et al. | |

(Continued)

FOREIGN PATENT DOCUMENTS

| | | |
|---|---|---|
| JP | 2009530874 A | 8/2009 |
| JP | 2010535434 A | 11/2010 |

(Continued)

OTHER PUBLICATIONS

Notice of Patent Grant dated Nov. 4, 2014 in connection with Japanese Patent Application No. 2012-526654; 5 pages.

(Continued)

*Primary Examiner* — Dung B Huynh

(57) ABSTRACT

A resource allocation message includes a resource allocation field. The resource allocation field includes a first field that includes either a first sub-field or a first sub-field and a second sub-field with the first sub-field configured to hold a first value that indicates two or more logical indices and the second sub-field configured to hold a third value. Each of the logical indices is associated with a sub-band pair of resource units. The sub-band pair of resource units includes either a first sub-band resource unit or a first sub-band resource unit and a second sub-band resource unit. The resource allocation field also includes a second field configured to hold a second value that indicates, either alone or in combination with the third value, a first sub-band resource unit or a second sub-band resource unit for each of the sub-band pair of resource units indicated by the first field.

52 Claims, 17 Drawing Sheets

(56) References Cited

U.S. PATENT DOCUMENTS

| | | | |
|---|---|---|---|
| 7,660,607 B2* | 2/2010 | Oh et al. | 455/562.1 |
| 7,937,090 B2 | 5/2011 | Bourlas et al. | |
| 7,957,345 B2 | 6/2011 | Yang et al. | |
| 8,102,802 B2 | 1/2012 | Ratasuk et al. | |
| 8,140,084 B2 | 3/2012 | Jung et al. | |
| 8,254,942 B2 | 8/2012 | McBeath et al. | |
| 2003/0100269 A1 | 5/2003 | Lehtinen et al. | |
| 2003/0232622 A1 | 12/2003 | Seo et al. | |
| 2005/0122936 A1 | 6/2005 | Son et al. | |
| 2005/0201269 A1 | 9/2005 | Shim et al. | |
| 2005/0232181 A1* | 10/2005 | Park et al. | 370/319 |
| 2006/0031924 A1 | 2/2006 | Kwon et al. | |
| 2006/0083326 A1 | 4/2006 | Roh et al. | |
| 2006/0098568 A1* | 5/2006 | Oh et al. | 370/206 |
| 2006/0120470 A1* | 6/2006 | Hwang et al. | 375/260 |
| 2007/0019583 A1 | 1/2007 | Laroia et al. | |
| 2007/0217362 A1* | 9/2007 | Kashima et al. | 370/330 |
| 2008/0014876 A1* | 1/2008 | Heikkila et al. | 455/114.2 |
| 2008/0025247 A1* | 1/2008 | McBeath et al. | 370/321 |
| 2008/0102850 A1 | 5/2008 | Jung et al. | |
| 2008/0153504 A1 | 6/2008 | Bourlas et al. | |
| 2009/0149188 A1 | 6/2009 | McBeath et al. | |
| 2009/0228598 A1* | 9/2009 | Stamoulis et al. | 709/230 |
| 2009/0285168 A1* | 11/2009 | Choi et al. | 370/329 |
| 2010/0118991 A1* | 5/2010 | Lee et al. | 375/260 |
| 2010/0135222 A1* | 6/2010 | Arnott | 370/329 |
| 2010/0165933 A1* | 7/2010 | Fukui et al. | 370/329 |
| 2010/0177718 A1* | 7/2010 | Harle et al. | 370/329 |
| 2010/0177723 A1* | 7/2010 | Kim et al. | 370/329 |
| 2010/0290405 A1* | 11/2010 | Arnott et al. | 370/329 |
| 2010/0309868 A1* | 12/2010 | Yang et al. | 370/329 |
| 2011/0053627 A1 | 3/2011 | Ramakrishna | |
| 2011/0134861 A1* | 6/2011 | Seo et al. | 370/329 |
| 2011/0200004 A1* | 8/2011 | Nakashima | H04J 13/0062 370/330 |
| 2012/0093079 A1* | 4/2012 | Yuk et al. | 370/328 |

FOREIGN PATENT DOCUMENTS

| | | |
|---|---|---|
| KR | 10-2008-0030281 | 4/2008 |
| KR | 10-2008-0030923 | 4/2008 |
| KR | 20080030293 A | 4/2008 |
| WO | WO 2008041417 A1 * | 4/2008 |
| WO | WO 2009/017260 A2 | 2/2009 |

OTHER PUBLICATIONS

International Search Report dated Jun. 1, 2011 in connection with International Patent Application No. PCT/KR2010/005726.

Written Opinion of the International Searching Authority dated Jun. 1, 2011 in connection with International Patent Application No. PCT/KR2010/005726.

Translated Japanese Notice of Preliminary Rejection dated May 13, 2014 in connection with Japanese Application No. 2012-526654; 6 pages.

Translated Chinese Office Action dated Feb. 26, 2014 in connection with Chinese Application No. 2010800382059; 11 pages.

3GPP TS 36.213 V8.2.0; Technical Specification Group Radio Access Network; Evolved Universal Terrestrial Radio Acccess (E-UTRA); Physical layer procedures; Mar. 2008; 3 pgs.

Notice of Preliminary Rejection dated Aug. 5, 2016 in connection with Korean Application No. 10-2012-7005696, 8 pages.

Fifth Office Action dated Jun. 13, 2016 in connection with Chinese Application No. 201080038205.9, 13 pages.

Yanfeng Guan, et al., "Proposed "Resource Allocation" field in Assignment A-MAP-IEs", IEEE 802.16 Broadband Wireless Access Working Group, Aug. 24, 2009, 12 pages.

3GPP TS 36.213 V8.7.0, 3rd Generation Partnershp Project; Technical Specification Group Radio Access Network; Evolved Universal Terrestrial Radioa Access (E-UTRA); Physical Layer Procedures (Release 8), May, 2009, 77 pages.

\* cited by examiner

| SBP[w] → <br> SBP[u] (=SBP[v]) ↓ | 0 | 1 | 2 | 3 | 4 | 5 | 6 | 7 | 8 | 9 | 10 |
|---|---|---|---|---|---|---|---|---|---|---|---|
| 0 | 0 | | | | | | | | | | |
| 1 | 10 | 0 | | | | | | | | | 9 |
| 2 | 20 | | | | | | | | | | 19 |
| 3 | 30 | | | | | | | | | | 29 |
| 4 | 40 | | | | | | | | | | 39 |
| 5 | 50 | | | | | | | | | | 49 |
| 6 | 60 | | | | | | | | | | 59 |
| 7 | 70 | | | | | | | | | | 69 |
| 8 | 80 | | | | | | | | 7 | | 79 |
| 9 | 90 | | | | | | | | | | 89 |
| 10 | 100 | 101 | 102 | 103 | 104 | 105 | 106 | 107 | 108 | 109 | 99 |

FIGURE 8

| SBP[w] → SBP[u] (=SBP[v]) → | 0 | 1 | 2 | 3 | 4 | 5 | 6 | 7 | 8 | 9 | 10 |
|---|---|---|---|---|---|---|---|---|---|---|---|
| 0 |  | 0 | 1 | 3 | 6 | 10 | 15 | 21 | 28 | 36 | 45 |
| 1 | 55 | 65 | 2 | 4 | 7 | 11 | 16 | 22 | 29 | 37 | 46 |
| 2 | 56 | 66 | 74 | 5 | 8 | 12 | 17 | 23 | 30 | 38 | 47 |
| 3 | 57 | 67 | 75 | 82 | 9 | 13 | 18 | 24 | 31 | 39 | 48 |
| 4 | 58 | 68 | 76 | 82 | 89 | 14 | 19 | 25 | 32 | 40 | 49 |
| 5 | 59 | 69 | 77 | 84 | 90 | 95 | 20 | 26 | 33 | 41 | 50 |
| 6 | 60 | 70 | 78 | 85 | 91 | 96 | 100 | 27 | 34 | 42 | 51 |
| 7 | 61 | 71 | 79 | 86 | 92 | 97 | 101 | 104 | 35 | 43 | 52 |
| 8 | 62 | 72 | 80 | 87 | 93 | 98 | 102 | 105 | 107 | 44 | 53 |
| 9 | 63 | 73 | 81 | 88 | 94 | 99 | 103 | 106 | 108 | 109 | 54 |
| 10 | 64 |  |  |  |  |  |  |  |  |  |  |

| ITF value | Position of SB[x] in SBP[u] (Higher index/Lower index) | Position of SB[y] in SBP[v] (Higher index/Lower index) | Position of SB[z] in SBP[w] (Higher index/Lower index) |
|---|---|---|---|
| 0110 | Higher | Higher | Higher |
| 0111 | Higher | Higher | Lower |
| 1000 | Higher | Lower | Higher |
| 1001 | Higher | Lower | Lower |
| 1010 | Lower | Higher | Higher |
| 1011 | Lower | Higher | Lower |
| 1100 | Lower | Lower | Higher |
| 1101 | Lower | Lower | Lower |

| SBP[w] → ↓ SBP[u], SBP[v] | 2 | 3 | 4 | 5 | 6 | 7 | 8 | 9 |
|---|---|---|---|---|---|---|---|---|
| 0, 1 | 0 | 1 | 4 | 10 | 20 | 35 | 56 | 84 |
| 0, 2 |  | 2 | 5 | 11 | 21 | 36 | 57 | 85 |
| 0, 3 |  |  | 6 | 12 | 22 | 37 | 58 | 86 |
| 0, 4 |  |  |  | 13 | 23 | 38 | 59 | 87 |
| 0, 5 |  |  |  |  | 24 | 39 | 60 | 88 |
| 0, 6 |  |  |  |  |  | 40 | 61 | 89 |
| 0, 7 |  |  |  |  |  |  | 62 | 90 |
| 0, 8 |  |  |  |  |  |  |  | 91 |
| 1, 2 |  | 3 | 7 | 14 | 25 | 41 | 63 | 92 |
| 1, 3 |  |  | 8 | 15 | 26 | 42 | 64 | 93 |
| 1, 4 |  |  |  | 16 | 27 | 43 | 65 | 94 |
| 1, 5 |  |  |  |  | 28 | 44 | 66 | 95 |
| 1, 6 |  |  |  |  |  | 45 | 67 | 96 |
| 1, 7 |  |  |  |  |  |  | 68 | 97 |
| 1, 8 |  |  |  |  |  |  |  | 98 |

FIGURE 12A

| SBP[v] ↑ / →SBP[u] | 1 | 2 | 3 | 4 | 5 | 6 | 7 | 8 | 9 |
|---|---|---|---|---|---|---|---|---|---|
| 0 | 0 |   |   |   |   |   |   |   | 8 |
| 1 |   | 9 |   |   |   | 5 |   |   | 16 |
| 2 |   |   | 17 |   |   |   |   |   | 23 |
| 3 |   |   |   | 24 |   |   |   |   | 29 |
| 4 |   |   |   |   | 30 |   |   |   | 34 |
| 5 |   |   |   |   |   | 35 |   |   | 38 |
| 6 |   |   |   |   |   |   | 39 |   | 41 |
| 7 |   |   |   |   |   |   |   | 42 | 43 |
| 8 |   |   |   |   |   |   |   |   | 44 |

SYSTEM AND METHOD FOR EFFICIENT INDICATION OF DISTRIBUTED SUB-BAND RESOURCES

CROSS-REFERENCE TO RELATED APPLICATION(S) AND CLAIM OF PRIORITY

The present application is a division of U.S. patent application Ser. No. 12/855,533, filed Aug. 12, 2010, entitled "SYSTEM AND METHOD FOR EFFICIENT INDICATION OF DISTRIBUTED ED SUB-BAND RESOURCES", which claims priority to U.S. Provisional Patent Application No. 61/275,425, filed Aug. 28, 2009, entitled "SYSTEMATIC METHODS FOR EFFICIENT INDICATION OF SUB-BAND CONTIGUOUS RESOURCES IN OFDMA-BASED SYSTEMS" and U.S. Provisional Patent Application No. 61/292,761, filed Jan. 6, 2010, entitled "SYSTEMATIC METHODS FOR EFFICIENT INDICATION OF SUB-BAND CONTIGUOUS RESOURCES IN OFDMA-BASED SYSTEMS". The content of the above-identified patent documents is incorporated herein by reference.

TECHNICAL FIELD OF THE INVENTION

The present application relates generally to wireless communications and, more specifically, to a system and method for conveying sub-band resource allocations.

BACKGROUND OF THE INVENTION

In a cellular communications system, a certain geographical region is divided into regions called cells. The mobile stations (MSs) in each cell are served by a single base station (BS). A BS transmits information to a particular MS (or a group of MSs) in its cell on a radio path referred to as the downlink (DL), while the MSs transmit information to the BS on a radio path referred to as the uplink (UL).

SUMMARY OF THE INVENTION

A base station is provided. The base station comprises a transmit path circuitry configured to transmit a downlink frame. The downlink frame comprises a resource allocation message. The resource allocation message comprises a resource allocation field. The resource allocation field comprises a first field comprising either a first sub-field or a first and a second sub-field, with the first sub-field configured to hold a first value that indicates two or more logical indices, and the second sub-field configured to hold a third value. Each of the two or more logical indices is associated with a sub-band pair of resource units, and the sub-band pair of resource units comprises either a first sub-band resource unit or a first sub-band resource unit and a second sub-band resource unit. The resource allocation field also comprises a second field configured to hold a second value that, by itself or in combination with the third value, indicates a first sub-band resource unit or a second sub-band resource unit for each of the sub-band pair of resource units indicated by the first field.

A method of transmitting a resource allocation message in a base station is provided. The method comprises partitioning a resource allocation field of the resource allocation message into a first field comprising either a first sub-field or a first and a second sub-field, and a second field, and translating two or more logical indices into a first value. Each of the two or more logical indices is associated with a sub-band pair of resource units, and the sub-band pair of resource units comprises either a first sub-band resource unit or a first sub-band resource unit and a second sub-band resource unit. The method also includes identifying the first value in the first sub-field of the first field of the resource allocation field, and determining either a second value or a second value and a third vale to indicate a first sub-band resource unit or a second sub-band resource unit for each of the sub-band pair of resource units indicated by the first field. The method further includes identifying the second value in the second field of the resource allocation field and the third value in the second sub-field of the first field, and transmitting the resource allocation message in a downlink frame.

A subscriber station is provided. The subscriber station comprises a receive path circuitry configured to receive a downlink frame. The downlink frame comprises a resource allocation message. The resource allocation message comprises a resource allocation field, and the resource allocation field comprises either a first sub-field or a first sub-field and a second sub-field, with the first sub-field configured to hold a first value that indicates two or more indices, and the second sub-field configured to hold a third value. Each of the two or more logical indices is associated with a sub-band pair of resource units, and the sub-band pair of resource units comprises either a first sub-band resource unit or a first sub-band resource unit and a second sub-band resource unit. The resource allocation field also comprises a second field configured to hold a second value that indicates, either by itself or in combination with the third value, a first sub-band resource unit or a second sub-band resource unit for each of the sub-band pair of resource units indicated by the first field.

A subscriber station is provided. The subscriber station is configured to receive a resource allocation message in a downlink frame. The resource allocation message comprises a resource allocation field, and the resource allocation field comprises a first field comprising either a first sub-field or a first sub-field and a second sub-field, with the first sub-field having a first value that indicates two or more logical indices and the second sub-field having a third value. Each of the two or more logical indices is associated with a sub-band pair of resource units, and the sub-band pair of resource units comprises either a first sub-band resource unit or a first sub-band resource unit and a second sub-band resource unit. The resource allocation field also comprises a second field having a second value that indicates, either by itself or in combination with the third value, a first sub-band resource unit or a second sub-band resource unit for each of the sub-band pair of resource units indicated by the first field. The subscriber station is also configured to translate the first value into two or more logical indices. Each of the two or more logical indices is associated with a sub-band pair of resource units, and the sub-band pair of resource units comprises either a first sub-band resource unit or a first sub-band resource unit and a second sub-band resource unit. The subscriber station is further configured to translate either the second value alone or a combination of the second value and third value into a first sub-band resource unit or a second sub-band resource unit for each of the sub-band pair of resource units indicated by the first field.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates a table for translating a decimal value of a resource indexing field (RIF) to logical indices of three sub-band pairs according to an embodiment of this disclosure;

FIG. 10 illustrates a table for translating a decimal value of an indication type field (ITF) to the positions of three sub-bands within three sub-band pairs according to an embodiment of this disclosure;

FIGS. 12A and 12B illustrate a table generated by an extended binomial formula for translating a decimal value of a resource indexing field (RIF) to logical indices of three sub-band pairs according to another embodiment of this disclosure;

FIG. 13 illustrates a table for translating a decimal value of a 7-bit resource indexing field (RIF) to logical indices of three sub-band pairs according to a further embodiment of this disclosure;

DETAILED DESCRIPTION OF THE INVENTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

With regard to the following description, it is noted that the LTE term "node B" is another term for "base station" used below. Further, the term "cell" is a logical concept that can represent a "base station" or a "sector" belonging to a "base station". In the present disclosure, "cell" and "base station" are used interchangeably to indicate the actual transmission units (may be "sector" or "base station" and the like) in the wireless system. Also, the LTE term "user equipment" or "UE" is another term for "subscriber station" or "mobile station" used below. It is noted that in all the following figures, some optional features are explicitly marked while some are omitted for clarity purpose.

Figure 1:
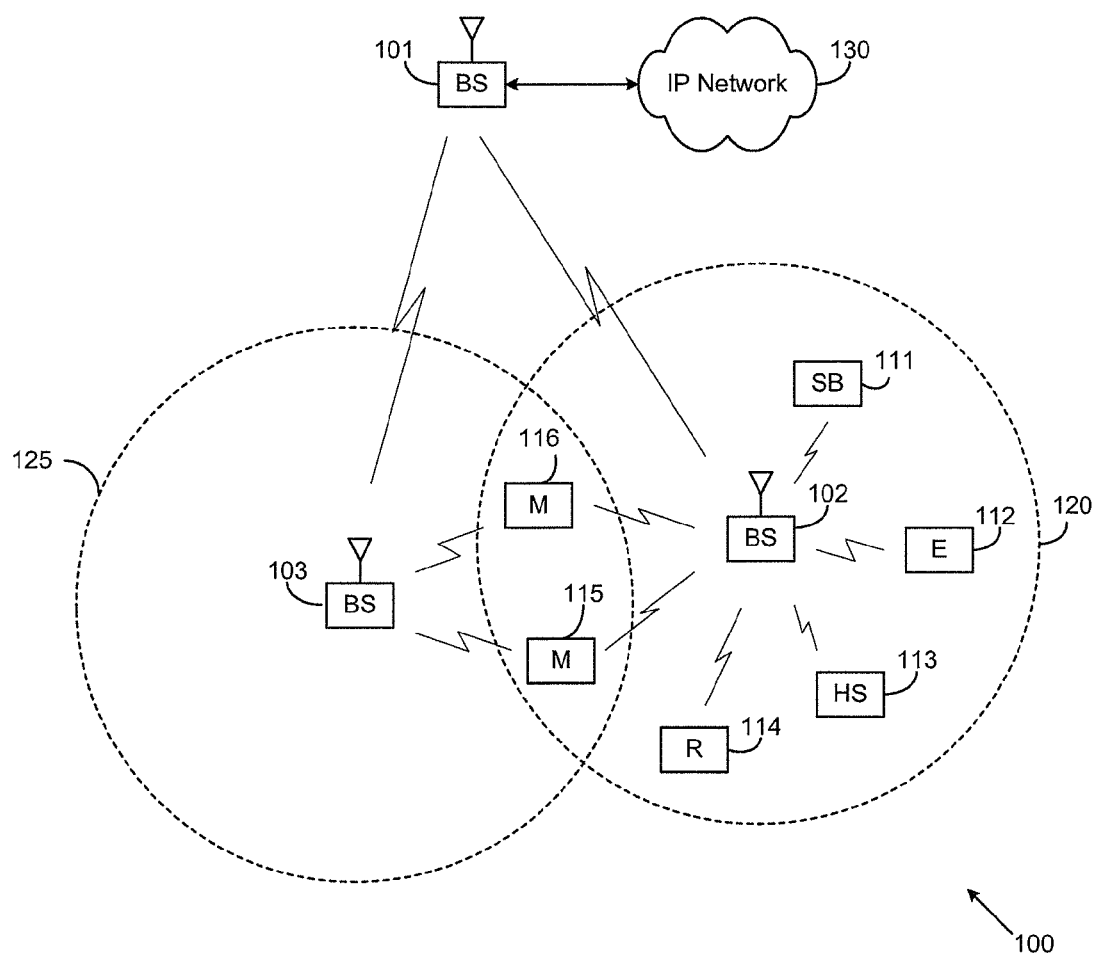
FIG. 1 illustrates an exemplary wireless network that transmits messages in the downlink according to the principles of the disclosure.

FIG. 1 illustrates an exemplary wireless network 100, which transmits messages according to the principles of this disclosure. In the illustrated embodiment, wireless network 100 includes a base station (BS) 101, a base station (BS) 102, a base station (BS) 103, and other similar base stations (not shown). Base station 101 is in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SE), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with subscriber stations 111-116 using OFDM or OFDMA techniques.

Base station 101 may be in communication with either a greater number or a lesser number of base stations. Furthermore, while only six subscriber stations are depicted in FIG.

1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
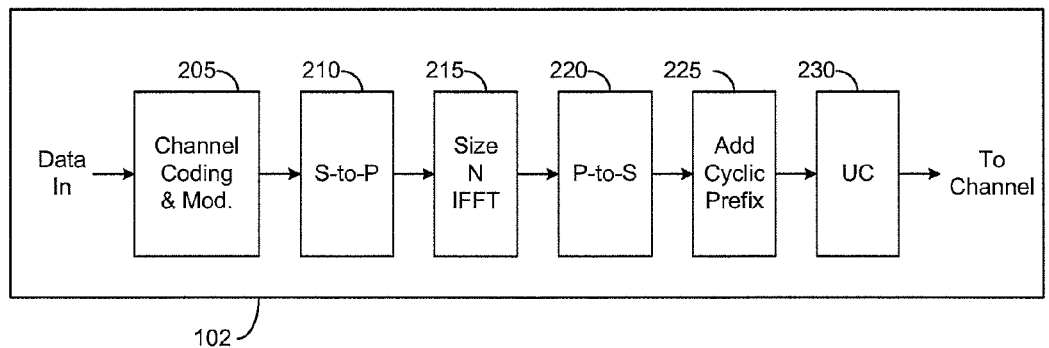
FIG. 2 is a high-level diagram of an OFDMA transmitter according to one embodiment of this disclosure.
Figure 3:
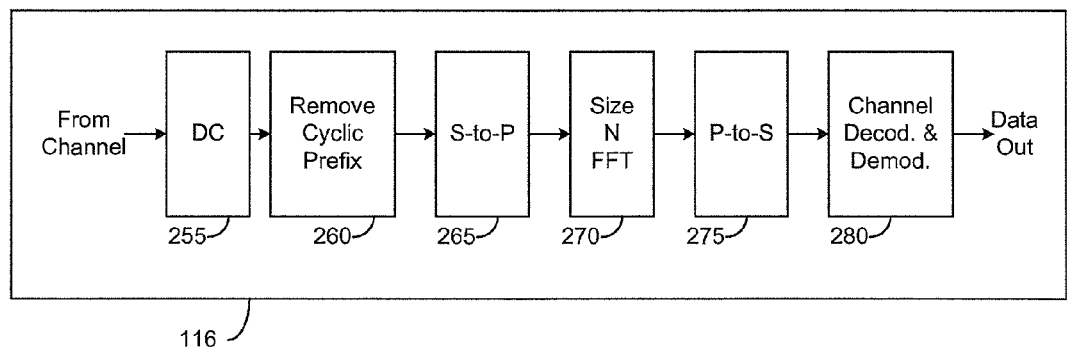
FIG. 3 is a high-level diagram of an OFDMA receiver according to one embodiment of this disclosure.

FIG. 2 is a high-level diagram of an orthogonal frequency division multiple access (OFDMA) transmit path. FIG. 3 is a high-level diagram of an orthogonal frequency division multiple access (OFDMA) receive path. In FIGS. 2 and 3, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The transmissions on the UL and the DL may be on the same time intervals but on different frequency bands (referred to as frequency division duplexing, FDD), or on the same frequency band but during non-overlapping time intervals (referred to as time division duplexing, TDD).

The embodiments of this disclosure are described in relation to a cellular communication system where the transmissions on the DL and UL are based on OFDM (Orthogonal Frequency Division Multiplexing) modulation. In OFDM modulation, the available bandwidth for the radio link (DL or UL) is divided into a large number of smaller-bandwidth units referred to as sub-carriers (SCs), onto which the information to be transmitted is embedded.

Due to OFDM modulation, on the UL, if the MSs in a particular cell simultaneously use non-overlapping SC sets to make transmissions to the BS, then when received at the BS, the transmission from any MS is rendered orthogonal to the transmission from any other MS. For example, if MS i uses SC set {Si} to make UL transmissions to the BS, and the SC sets used by different MSs are non-overlapping, then when received at the BS, the transmissions from MS i on SC set {Si} are not interfered with by any of the transmissions to the BS from any of the MSs j, j≠i.

Similarly, on the DL, if the BS uses non-overlapping SCs to make simultaneous transmissions to different MSs, then at a particular MS, the transmissions meant for other MSs appear orthogonal to the transmissions meant for that particular MS. For example, if the BS makes transmissions to MS i using SC set {Si} and uses non-overlapping SC sets to make transmissions to various MSs, then when received at the MS i, the transmissions from the BS on SC set {Si} are not interfered with by any of the transmissions from the BS to any of the other MSs j, j≠1.

This property of OFDM modulation allows simultaneous communications between several MSs and the BS on the UL, and the BS and several MSs on the DL.

In an OFDM-based system, the basic time unit over which the transmissions (from the BS to the MSs, and the MSs to the BS) occur is called an OFDM symbol.

In such a system, on the UL, the transmissions by the MSs are coordinated to ensure that non-overlapping SC sets are being used, and each MS has to be instructed by the BS as to which SC set to use for transmissions to the BS. Similarly, on the DL, the BS uses non-overlapping SC sets to make transmissions to the MSs, and the MSs have to be instructed by the BS as to which SC sets to listen to receive the transmissions meant for the MSs.

The instructions to the MSs, whether regarding which SC set to use for UL transmissions or which SC set to receive DL transmissions on, are referred to as resource allocation messages. These resource allocation messages are transmitted by the BS on an SC set referred to as the resource allocation region. To clarify, several resource allocation messages, each meant for a particular MS or a group of MSs, are carried on SCs that are part of the resource allocation region.

The resource allocation region is known to all MSs. Each MS receives, decodes and interprets the resource allocation messages in the resource allocation region to learn about the SC set that the MS is to use for UL transmissions and/or the SC set on which the MS is to receive DL transmissions.

The logical index of a resource is the index with which a resource is referred to in allocations, and which, along with a convention for translation to physical resources, allows a BS or an MS to determine the physical resource that is being referred to in allocations. The SC sets that are available to make transmissions by the BS to the MSs on the DL and by the MSs to the BS on the UL are classified into two broad categories.

Distributed resources: These are collections of distributed resource units, where a distributed resource unit is a subset of a known size (in the number of SCs and OFDM symbols), of logical indices of SCs, in which SCs that are contiguous with respect to their logical indices are not physically contiguous with respect to their location in the physical bandwidth of transmission. Transmission on distributed resources allows the receiver to experience the average channel conditions over the entire, or a relatively large portion of, the total available bandwidth.

Contiguous resources: These are collections of contiguous resource units (CRUs), where contiguous resource units are subsets of a known size (in the number of SCs and OFDM symbols), of logical indices of SCs consisting of physically contiguous SCs (i.e., the component SCs that have contiguous logical indices are also physically contiguous).

In the context of the above descriptions, a sub-band (SB) consists of a pre-determined (known to all BSs and all MSs) number of CRUs, such that the set of SCs in the sub-band are physically contiguous.

SB resources are typically meant to be utilized in order to perform "frequency selective" transmissions. An SB typically spans a small portion of the overall available bandwidth, or "samples" a small portion of the overall bandwidth. Due to the fact that all the SCs in the SB are physically contiguous, the channel conditions across them are expected to be similar in many cases. An MS may experience a wide variation in radio channel conditions across the entire bandwidth. The MS estimates the radio channel conditions across the many SBs that make up the entire bandwidth, and feeds them back to the BS. The BS may then schedule transmissions to the MS on only the good SBs.

The IEEE 802.16e system (IEEE Std. 802.16e-2005, IEEE Standard for Local and metropolitan area networks, —Part 16: Air Interface for fixed and mobile broadband wireless access systems, —Amendment 2: Physical and Medium Access Control Layers for Combined Fixed and Mobile Operation in Licensed Bands, and IEEE Std. 802.16-2004/Cor1-2005, Corrigendum 1, December 2005) is an example of an OFDM based system employing the above descriptions, and is hereby incorporated by reference into the present application as if fully set forth herein. In the IEEE 802.16e system, the resource allocation messages are referred to as MAP messages, and the resource allocation region is referred to as the MAP-Region.

The proposed IEEE 802.16m system (IEEE P802.16m/D1, "Part 16: Air Interface for Broadband Wireless Access Systems", July 2009) is another example of an OFDM based system employing the above descriptions, and is hereby incorporated by reference into the present application as if fully set forth herein. In the IEEE 802.16m system, the following specializations apply. A CRU consists of an SC-OFDM-symbol grid consisting of 18 physically contiguous SCs per OFDM symbol X 6 OFDM symbols. A sub-band consists of 4 CRUs, which is a grid of 72 SCs per OFDM symbol, consisting of 4 sets of 18 physically contiguous SCs X 6 OFDM symbols. The 72 SCs in the sub-band are physically contiguous. Due to other numerology, there is a maximum of 10 SBs in a 10 MHz system and a maximum of 21 in a 20 MHz system.

With regard to the SB resources, the issue of the allocation of SB resources to the MS (i.e., informing the MS to receive transmissions on particular SBs on the DL, or make transmissions on particular SBs on the UL, via the resource allocation messages described earlier) will be described.

Since an SB is identified by its logical index, there is a concern with conveying a set of SB logical indices to the MS. Due to the typical use case of utilizing SBs to make transmissions on portions of the bandwidth where the radio link is good, the ability to be able to signal sets of SBs with non-contiguous logical indices is important.

In the proposed IEEE 802.16m system, a special set of messages, called the "Downlink Sub-band Assignment IE" and the "Uplink Sub-band Assignment IE", have been defined to convey the assignment of DL & UL sub-band resources, respectively. The "IE" in the message names stands for "Information Element". In these messages, an 11-bit field referred to as the "Resource Allocation" (RA) field has been defined. The RA field conveys the number of sub-bands allocated and their logical indices to the MS.

In the cases of 5, 10 and 20 MHz systems, the proposed IEEE 802.16m system defines the maximum number of SBs to be 4, 10 and 21, respectively. For the 5 and 10 MHz systems, the number of RA bits (11 bits) is always larger than the number of SBs (a maximum of 4 sub-bands for a 5 MHz system and 10 sub-bands for a 10 MHz system). Hence, simple bit-map based methods may be used to map the 11-bit RA field to an allocation of an arbitrary set of sub-bands.

However, for the 20 MHz case, the number of SBs (a maximum of 21) may exceed 11 bits, the size of the RA field. Here, the problem is to utilize the 11 RA bits in a single IE to indicate the set of SB logical indices allocated. For example, one may want to make the allocation {SB0, SB5} or the allocation {SB0, SB6, SB7} to an MS. In order to do this, one needs to develop a mapping between the 11 RA bits and the number and logical indices of the SBs being allocated. The primary focus of this disclosure is on mapping of non-contiguous indices as there are simple methods of mapping the assignment of SBs with contiguous logical indices (for example, the assignment {SB1, SB2}).

Because the proposed IEEE 802.16m system limits the maximum number of sub-bands in a 20 MHz system to 21 sub-bands, a simple calculation of the number of combinations of non-contiguous sub-band logical indices (for the cases of 2 or 3 SB allocations) when there are a total of 21 SBs in the system can be performed.

For example, the number of combinations of 2 non-contiguous sub-band logical indices may be calculated. The number of combinations of 2 sub-band logical indices (out of a maximum possible of 21), is calculated as shown in Equation 1 below:

$$^{21}C_2 = \frac{21!}{2!19!} = 210. \quad [\text{Eqn. 1}]$$

Out of these, 20 combinations consist of pairs of contiguous logical indices (e.g., the combinations {0, 1}, {1, 2}, and so on). Hence, the number of combinations of the non-contiguous logical indices of 2 SBs is 210−20=190.

For example, the number of combinations of 3 non-contiguous SB logical indices may be calculated. The number of combinations of 3 sub-band logical indices (out of a maximum possible of 21) is calculated as shown in Equation 2 below:

$$^{21}C_3 = \frac{21!}{3!18!} = 1330. \quad [\text{Eqn. 2}]$$

Out of these, 19 combinations consist of contiguous logical indices (e.g., the combinations {0, 1, 2}, {1, 2, 3}, and so on). Hence, the number of combinations of the non-contiguous logical indices of 3 SBs is 1330−19=1311.

The total number of combinations of non-contiguous allocations of 2 or 3 SBs, therefore, is 190+1311=1501.

It may be noted that if there are fewer than 21 sub-bands in the system, the number of combinations of 2 or 3 SBs will be smaller than these numbers. Hence, the number of combinations of 2 or 3 SBS calculated above represent the upper limit on the number of combinations (of 2 or 3 SBs) that may need to be conveyed using the 11 RA bits.

Using 11 bits, one may convey a total of $2^{11}$=2048 combinations. Hence, using the 11 RA bits in a single IE, it should be possible to convey any of the 1501 allocations of 2 or 3 SBs with non-contiguous logical indices. The problem, however, is in the actual method used to map the resource allocation bits to a particular sub-band allocation. One possible method is to use a look-up table to map each of 1501 (out of 2048) values of the 11 bit RA to a particular SB allocation (out of the 1501 possible allocation of 2 or 3 SBs).

A problem with using a look-up table to do the mapping from a specific value of the RA field to a specific set of SB indices is that it necessitates the storage of large tables at the BS and MS. For example, the indication of 2 or 3 SBs will require a table with 1501 entries in it. Also, such a table will lead to extensive search operations at the BS and MS, adding to the system complexity. For example, if a BS wants to make the assignment {SB0, SB3, SB7}, the BS will have to search through the entries to find the value of the RA that maps to this allocation because a look-up table does not provide any systematic way of searching. Similarly, on receiving the 11 RA bits, the MS will have to search through the table to find out the assignment.

This disclosure provides a system and method for efficiently conveying SB resource allocations to an MS. The disclosed system and method are systematic in the sense that a structure is imposed on the resource allocation bits to allow simple interpretation of the allocations. Hence, one does not have to resort to a brute-force search that is part of a look-up table solution.

It should be noted that in the embodiments of this disclosure, it is assumed that a mapping from the logical index to the physical index of an SB is known to all BSs and MSs.

Figure 4:
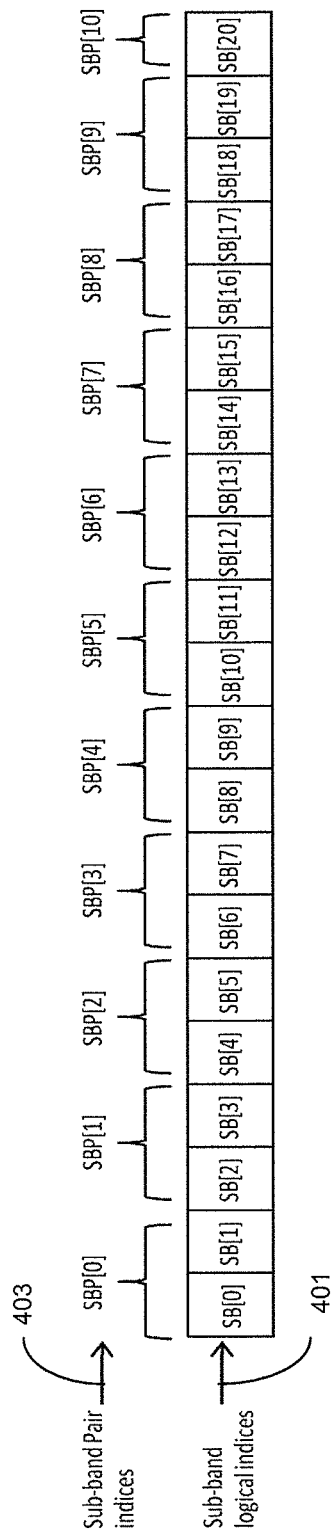
FIG. 4 illustrates the grouping of sub-band logical indices into the indices of sub-band pairs according to an embodiment of this disclosure.

FIG. 4 illustrates the grouping of sub-band logical indices into sub-band pairs according to an embodiment of this disclosure.

This disclosure provides the grouping of the SB logical indices into "Sub-band Pairs". A "Sub-band Pair" (SBP) contains a pair of sub-bands with contiguous indices. In a particular embodiment, the indices of a sub-band pair and the corresponding sub-bands are related as follows: SBP[j]←→{SB[2j], SB [2j+1]}.

In the case that SB[2j+1] is not a valid index, SBP[j] only contains SB[2j], i.e., SBP[j]←→{SB[2j]}. For example, as shown in FIG. 4, in a 20 MHz system where there are a maximum of 21 sub-bands 401, the corresponding 11 sub-band pairs 403 are indexed as: SBP[0]←→{SB[0], SB[1]}, SBP[1]←→{SB[2], SB[3]}, . . . , SBP[9]←→{SB[18], SB[19]}, while SBP[10]←→{SB[20]}. This way of grouping the sub-band indices allows the indication of the indices of 2 or 3 allocated sub-bands in a systematic way as shown in the following embodiments.

Figure 5:
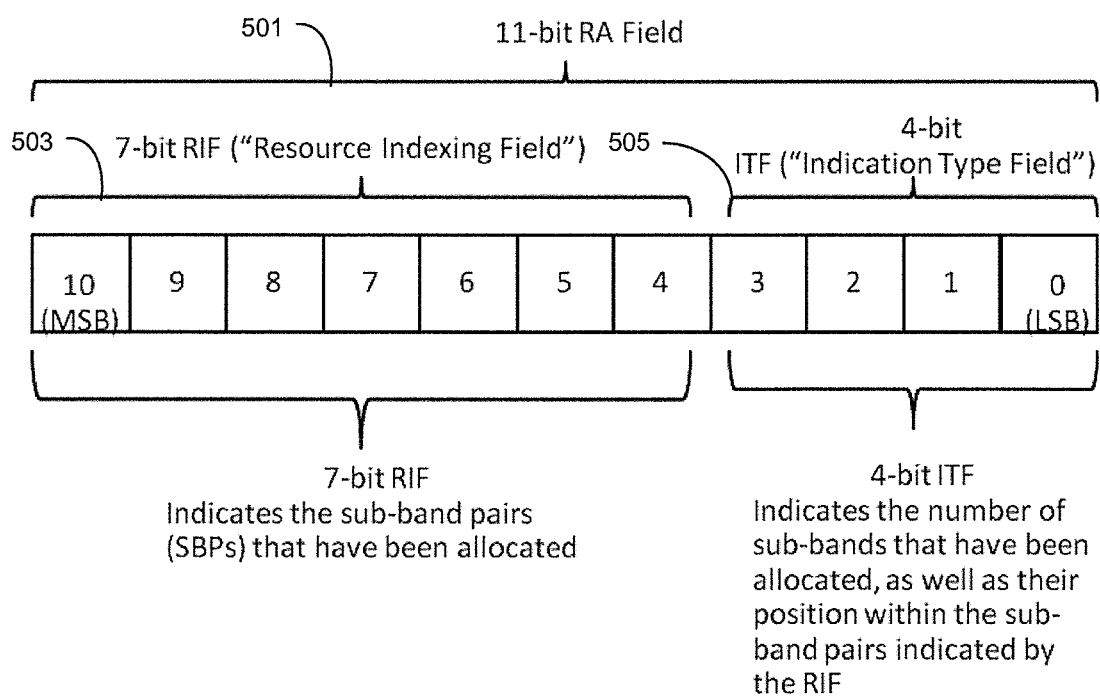
FIG. 5 illustrates a Resource Allocation (RA) field according to an embodiment of this disclosure.

FIG. 5 illustrates a Resource Allocation (RA) field according to an embodiment of this disclosure.

As shown in FIG. 5, the 11 bits of the Resource Allocation (RA) field 501 are partitioned into two portions, referred to as the "Resource Indexing Field" (RIF) 503 and the "Indication Type Field" (ITF) 505. The mapping between the RA field 501 and the allocated sub-band indices are provided by the RIF 503 and ITF 505. In a particular embodiment, the RIF 503 indicates the sub-band pair(s) being allocated, while the ITF 505 further indicates the particular sub-bands within the sub-band pairs that are being allocated. In the example shown in FIG. 5, the RIF 503 consists of the first 7 most significant bits (MSB) of the RA field 501, while ITF consists of the last 4 least significant bits (LSB) of the RA field 501.

While the RIF 503 is identified using the 7 MSB of the RA field 501 and the ITF is identified using the 4 LSB in this example, one of ordinary skill in the art would recognize that other identification/mapping between the RIF bits and the RA bits, and likewise for the ITF bits, are within the scope and spirit of this disclosure. For example, one could identify the 7 LSB of the RA field as the RIF and the 4 MSB of the RA field as the ITF.

In one embodiment, the values of the ITF from 0000 through 0011 indicate the assignment of 2 sub-bands. In a particular embodiment, the assigned sub-bands are denoted as SB[x] and SB[y], belonging to SBP[u] and SBP[v] respectively, and denoted as SB [x]←→SBP[u] and SB [y]←→SBP[v], the values of the ITF from 0000 through 0011 are interpreted as follows.

1. ITF=0000➔ both SB[x] and SB [y] are the lower SB indices in SBP[u] and SBP[v], respectively;

2. ITF=0001➔ both SB [x] and SB[y] are the higher SB indices in SBP[u] and SBP[v], respectively;

3. ITF=0010➔ SB[x] is the lower SB index in SBP[u], and SB [y] is the higher SB index in SBP[v]; and 4. ITF=0011➔ SB[x] is the higher SB index in SBP[u], and SB [y] is the lower SB index in SBP[v].

The RIF is then interpreted to determine the SBPs allocated. Accordingly, knowledge of the SBPs allocated, along with the information about the allocated sub-bands within the SBPs as indicated by the ITF, completes the allocation details for this case.

Figure 6:
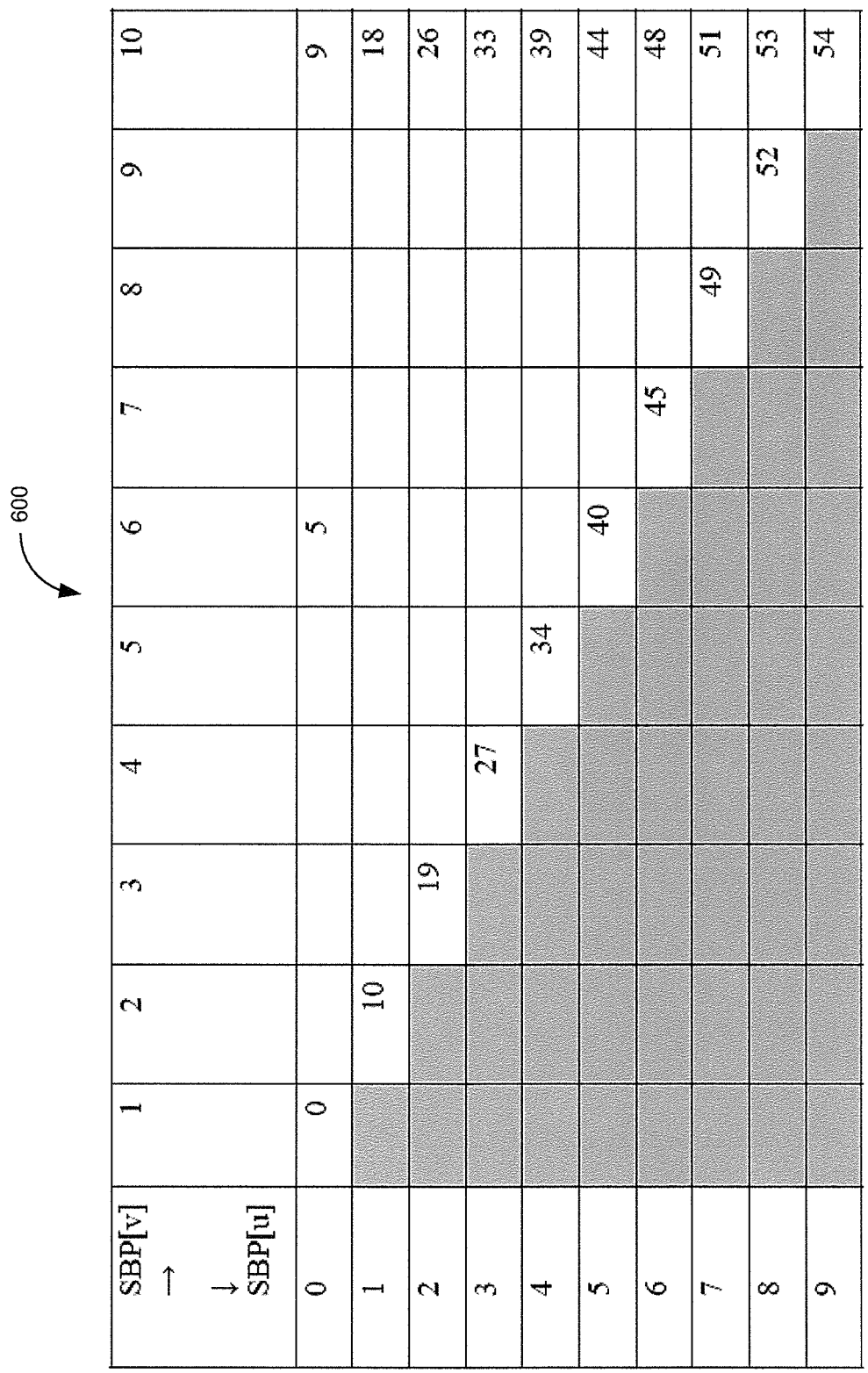
FIG. 6 illustrates a table for translating a decimal value of a resource indexing field (RIF) to logical indices of two sub-band pairs according to an embodiment of this disclosure.

FIG. 6 illustrates a table 600 for translating a decimal value of a 7-bit resource indexing field (RIF) to two sub-band pairs according to this embodiment of this disclosure.

In some embodiments, the 7 bits of the RIF are interpreted using a table to indicate the two sub-band pairs SBP[u] & SPB[v] that have been allocated.

Table 600 shows a particular embodiment in which the decimal values of the 7-bit RIF increase from left to right and from top to bottom (the first and last values in each row of the table are shown). The shaded values are not used to make interpretations. Each particular cell in the table corresponds to a particular decimal value of the RIF and indicates the values of the SBPs SBP[u] and SBP[v] that have been allocated.

For example, consider the case where RA=00001010001 (i.e., RIF=0000101=decimal value 5, and ITF=0001). The ITF indicates a 2 sub-band allocation. Let the two allocated sub-bands be denoted as SB [x] and SB[y], with SB [x]←→SBP[u] and SB [y]←→SBP[v]. From table 600, RIF=5 corresponds to the allocation SBP[u]=SBP[0]={SB [0], SB[1]}, and SBP[v]=SBP[6]={SB[12], SB[13]}. ITF=0001 implies that the higher SB indices in both SBP[u] and SBP[v] are being indicated. Therefore, the allocation is SB[x]=SB[1] and SB[y]=SB[13].

In another embodiment, the decimal value of the RIF corresponds to the pair of SBPs, {SBP[u], SBP[v]}, as shown in Equation 3 below:

$$RIF = \binom{u}{1} + \binom{v}{2}, u < v, \quad [\text{Eqn. 3}]$$

where for integers n and k, the extended binomial coefficient is defined as $$\binom{n}{k} = \begin{cases} \binom{n}{k}, & n \geq k \\ 0, & n < k \end{cases},$$

where the well-known Binomial coefficient is given as $$\binom{n}{k} = \frac{n!}{k!(n-k)!}, n \geq k > 0.$$

The above formula for the mapping between the RIF and the indices 'u', 'v' of the SBPs {SBP[u], SBP[v]} leads to a unique mapping. In other words, for any pair of SBP indices {u, v}, the RIF calculated from them using Equation 3, denoted as RIF(u, v), will be different from the RIF($u_1$, $v_1$) calculated from a different pair of SBP indices {$u_1$, $v_1$}, where either u≠$u_1$ or v≠$v_1$.

Equation 3 maps the SBP indices 'u', 'v' to an RIF value, RIF(u, v). Reverse-indexing, i.e., the mapping from a value of the RIF to the unique indices {u, v} that generated the RIF value, also can be performed by one of ordinary skill in the art given Equation 3.

Figure 7:
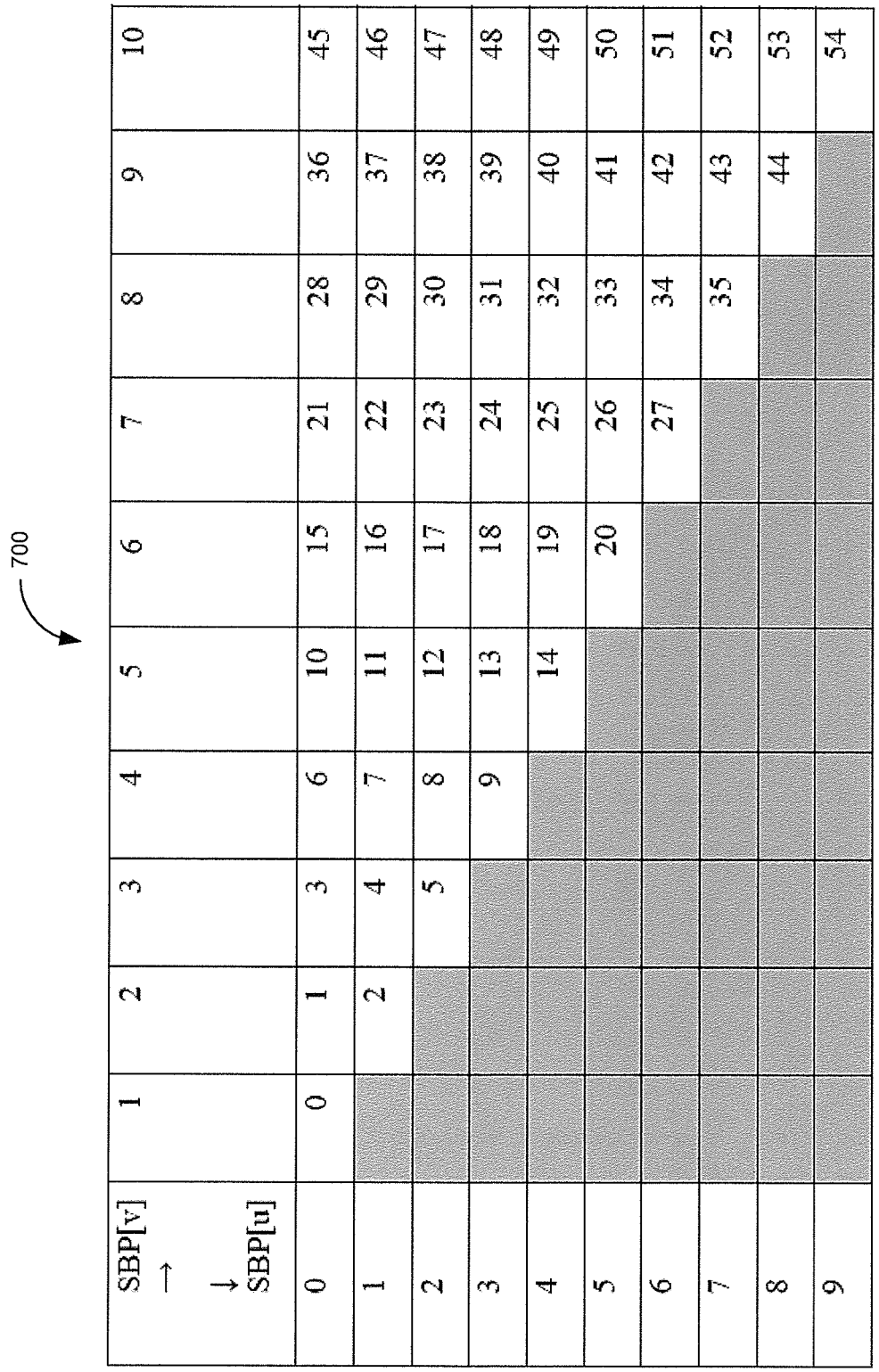
FIG. 7 illustrates a table generated by an extended binomial formula for translating a decimal value of a resource indexing field (RIF) to logical indices of two sub-band pairs according to an embodiment of this disclosure.

FIG. 7 illustrates a table 700 generated by an extended binomial formula for translating a decimal value of a resource indexing field (RIF) to two sub-band pairs according to an embodiment of this disclosure.

The mapping of the value of the RIF to two SBPs, {SBP[u], SBP[v]} resulting from Equation 3 may also be depicted in table form as shown in table 700 of FIG. 7. As with table 600, the shaded cells are not used to make interpretations.

FIG. 8 illustrates a table 800 for translating a decimal value of a 7-bit resource indexing field (RIF) to three sub-band pairs according to an embodiment of this disclosure.

The assigned sub-bands are denoted as SB[x], SB[y] and SB[z], belonging to SBP[u], SBP[v] and SBP[w], respectively. This is denoted as SB [x]←→SBP[u], SB[y]←→SBP [v] and SB[z]←→SBP[w].

In this embodiment, 2 of the 3 assigned sub-bands belong to the same SBP. Notationally, SB[x] and SB[y] belong to the same SBP (i.e., SBP[u]=SBP[v], or u=v).

In a particular example, the ITF values 0100 and 0101 indicate these cases and are interpreted as follows:

1. ITF=0100➔ SB[z] is the lower SB index in SBP[w]; and

2. ITF=0101➔ SB[z] is the higher SB index in SBP[w].

The 7 bits of the RIF are interpreted using table 800 to indicate the three sub-band pairs SBP[u], SPB[v], SBP[w] that have been allocated. Because SBP[u]=SBP[v], i.e., u=v, the table only indicates SBP[u] & SBP[w].

In table 800, the decimal values of the 7 bits of the RIF increase from left to right and from top to bottom (the first and last values in each row of the table are shown). The shaded cells are not used to make interpretations. Each particular cell in the table corresponds to a particular decimal value of the RIF and indicates the values of the SBPs SBP[u] (=SBP[v]) and SBP[w] that have been allocated.

Knowledge of the SBPs allocated using table 800, along with the information about the allocated sub-bands within the SBPs as indicated by the ITF, completes the allocation details for this particular embodiment.

For example, if the RA field=00001110100 (i.e., decimal value of the RIF is 7 (=0000111), and ITF=0100), then from table 800, the RIF maps to the 3 sub-band pairs SBP[u]= SBP[v]=0 and SBP[w]=8. SBP[0]←→{SB [0], SB[1]}, while SBP[8]←→{SB[16], SB[17]}. The ITF indicates that the lower SB index in SBP[8] is being allocated. Hence, the allocation is {SB[0], SB[1], SB[16]}.

In another embodiment, the decimal value of the RIF corresponds to the triplet of SBPs, {SBP[u], SBP[v], SBP [w]}, with u=v, as shown in Equation 4 below:

$$RIF = \begin{cases} \binom{u}{1} + \binom{w}{2}, & u = v < w, \\ \binom{w}{1} + \binom{u}{2} + 55, & w < u = v \end{cases}, \quad [\text{Eqn. 4}]$$

where the extended binomial coefficent for two integers n and k denoted as $$\begin{Bmatrix} n \\ k \end{Bmatrix}$$

has been described earlier.

Figure 9:
FIG. 9 illustrates a table generated by an extended binomial formula for translating a decimal value of a resource indexing field (RIF) to logical indices of three sub-band pairs according to an embodiment of this disclosure.

FIG. 9 illustrates a table 900 generated by an extended binomial formula for translating a decimal value of a resource indexing field (RIF) to three sub-band pairs according to an embodiment of this disclosure.

The mapping of the value of the RIF to three SBPs, {SBP[u], SBP[v], SBP[w]}, with u=v, resulting from Equation 4 also may be depicted in table form as shown in table 900 of FIG. 9. As with table 600, the shaded cells are not used to make interpretations. Knowledge of the SBPs allocated using table 900, along with the information about the allocated sub-bands within the SBPs as indicated by the ITF as described earlier with respect to FIG. 8, completes the allocation details for this particular embodiment.

FIG. 10 illustrates a table 1000 for translating a decimal value of a 4-bit indication type field (ITF) to three sub-bands within three sub-band pairs according to an embodiment of this disclosure.

The assigned sub-bands are denoted as SB[x], SB[y] and SB[z], belonging to sub-band pairs SBP[u], SBP[v] and SBP[w], respectively. This is denoted as SB[x]←→SBP[u], SB[y]←→SBP[v] and SB[z]←→SBP[w]. Table 1000 illustrates the translation of the 4-bit ITF value to the positions (higher index/lower index) of x, y and z within u, v and w, respectively.

FIG. 11 illustrates a table 1100 for translating a decimal value of a 7-bit resource indexing field (RIF) to three sub-band pairs according to this embodiment of this disclosure.

This embodiment provides the allocation of 3 sub-bands, with all 3 in different sub-band pairs, not including SBP[10]. The assigned sub-bands are denoted as SB[x], SB[y] and SB[z], belonging to sub-band pairs SBP[u], SBP[v] and SBP[w], respectively, denoted as SB [x]←→SBP[u], SB [y]←→SBP[v] and SB [z]←→SBP[w], with u≠v≠w≠10.

FIG. 10 shows a table 1000 used to indicate 8 ITF values from 0110 through 1101 in a particular example. The 8 ITF values allow indication of all possible arrangements of the indicated 3 sub-bands SB[x], SB[y] and SB[z] within the 3 indicated sub-band pairs SBP[u], SBP[v] and SBP[w].

Figure 11A:
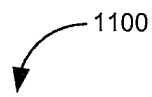
FIGS. 11A and 11B illustrate a table for translating a decimal value of a resource indexing field (RIF) to logical indices of three sub-band pairs according to another embodiment of this disclosure.
Figure 11B:
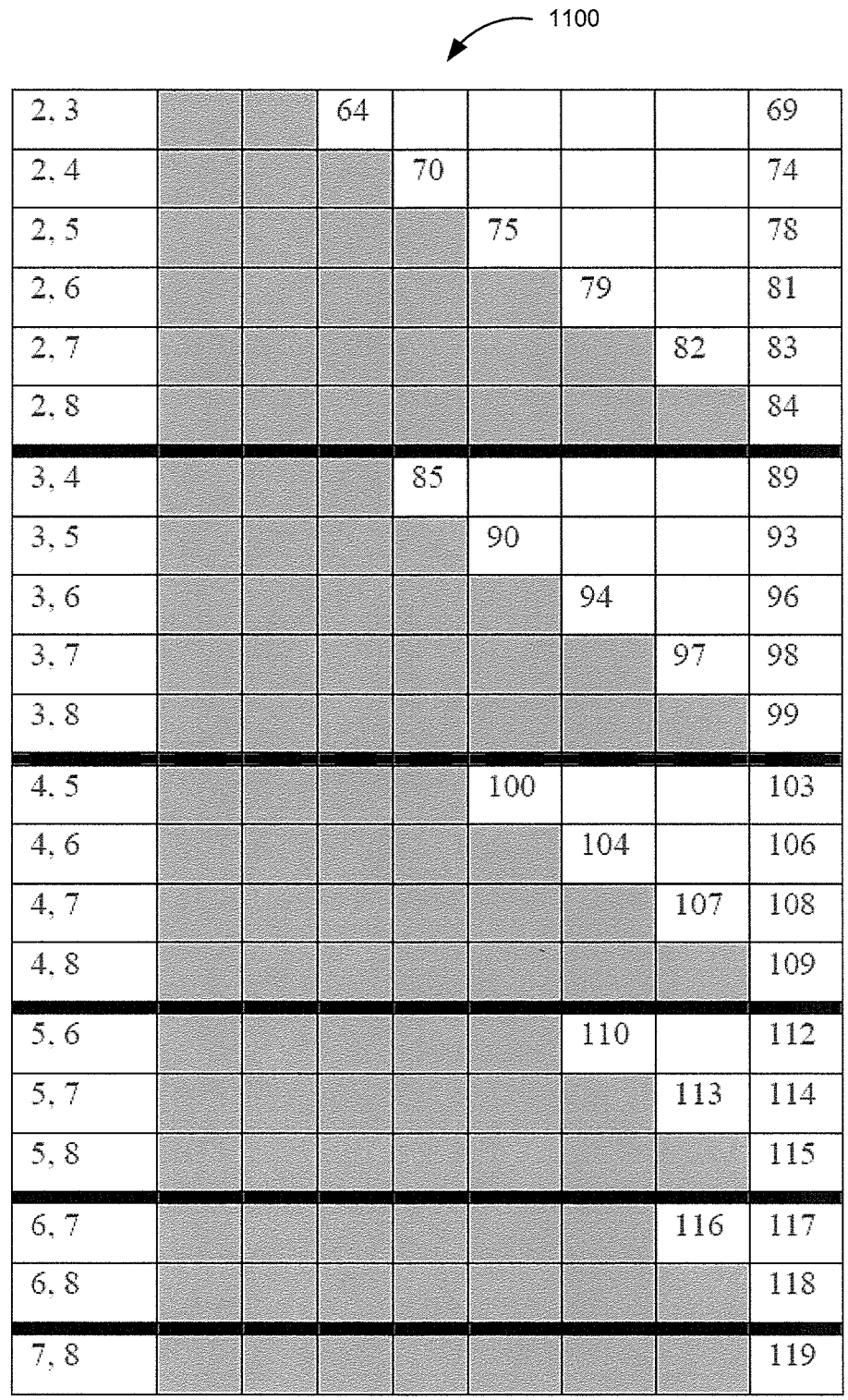

FIGS. 11A and 11B show a table 1100 used to interpret the 7 bits of the RIF to indicate the three sub-band pairs SBP[u], SPB[v], SBP[w] that have been allocated in a particular example.

In table 1100, the decimal values of the 7 bits of the RIF increase from left to right and from top to bottom (the first and last values in each row of the table are shown). The shaded values are not used to make interpretations. Each particular cell in the table corresponds to a particular decimal value of the RIF and indicates the values of the SBPs SBP[u], SBP[v] and SBP[w] that have been allocated.

Knowledge of the SBPs allocated from table 1100, along with the information about the allocated sub-bands within the SBPs as indicated by the ITF from table 1000, completes the allocation details for this sub-case.

For example, if the RA field=00001000110 (i.e., the decimal value of the RIF is 4 (=0000100) and ITF=0110), then from table 1100 the RIF maps to the 3 sub-band pairs SBP[u]=0, SBP[v]=1 and SBP[w]=6. SBP[0]←→{SB[0], SB[1]}, SBP[1]←→{SB[2, SB[3]} and SBP[6]←→{SB[12], SB[13]}. From table 1000, ITF=0110 implies that the allocated sub-bands are the ones with the higher indices in SPB[u], SPB[v] and SPB[w]. Hence, the allocation is {SB[1], SB[3], SB[13]}.

In another embodiment, the decimal value of the RIF corresponds to the triplet of SBPs, {SBP[u], SBP[v], SBP[w]}, with u≠v≠w and with neither of u, v or w equaling 10 as shown in Equation 5 below:

$$RIF = \begin{Bmatrix} u \\ 1 \end{Bmatrix} + \begin{Bmatrix} v \\ 2 \end{Bmatrix} + \begin{Bmatrix} w \\ 3 \end{Bmatrix}, u < v < w, \quad [\text{Eqn. 5}]$$

where the extended binomial coefficent for two integers n and k denoted as $$\begin{Bmatrix} n \\ k \end{Bmatrix}$$

has been described earlier.

Figure 12B:
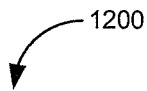

FIGS. 12A and 12B illustrate a table 1200 generated by an extended binomial formula for translating a decimal value of a resource indexing field (RIF) to three sub-band pairs according to another embodiment of this disclosure.

The mapping of the value of the RIF to three SBPs, {SBP[u], SBP[v], SBP[w]} with u≠v≠w≠10, resulting from Equation 4 also may be depicted in table form as shown in table 1200 of FIGS. 12A and 12B. As with table 600, the shaded cells are not used to make interpretations. Knowledge of the SBPs allocated from table 1200, along with the information about the allocated sub-bands within the SBPs as indicated by the ITF from table 1000, completes the allocation details for this particular embodiment.

FIG. 13 illustrates a table 1300 for translating a decimal value of a 7-bit resource indexing field (RIF) to three sub-band pairs according to a further embodiment of this disclosure.

This embodiment provides the allocation of 3 sub-bands, with all 3 in different sub-band pairs, including SBP[10]. The assigned sub-bands are denoted as SB[x], SB[y] and SB[z], belonging to sub-band pairs SBP[u], SBP[v] and SBP[w], respectively, with u≠v≠w, and w=10. Hence, in this embodiment, one of the allocated sub-bands, SB[z], equals SB[20].

In a particular embodiment, the 2 ITF values 1110 and 1111 are used to indicate that one of the allocated sub-bands equals SB[20], and these ITF values are interpreted as follows.

1. ITF=1110➔ SB[x] and SB[y] are both the higher SB indices in SBP[u] and SBP[v] or both the lower indices in SBP[u] and SBP[v]; and 2. ITF=1111➔ Either SB[x] is the higher SB index in SBP[u] and SB[y] is the lower SB index in SBP[v], or SB[x] is the lower SB index in SBP[u] and SB[y] is the higher SB index in SBP[v].

The MSB of the RIF provides further indication about SB[x] and SB[y] as follows:

1. MSB of RIF=0➔ SB[x] is the higher SB index in SBP[u]; and

2. MSB of RIF=1➔ SB[x] is the lower SB index in SBP[u].

The values of the ITF and the MSB bit of the RIF, taken together, complete the information about the position of SB[x] and SB[y] within SBP[u] and SBP[v], respectively.

The 6 LSB of the RIF are interpreted using table 1300 for example to indicate the sub-band pairs SBP[u] and SPB[v] that have been allocated.

In table 1300, the decimal values of the 6 LSB bits of the RIF increase from left to right and from top to bottom (the first and last values in each row of the table are shown). The shaded values are not used to make interpretations. Each particular cell in the table corresponds to a particular decimal value of the RIF and indicates the values of the SBPs SBP[u] and SBP[v] that have been allocated.

Knowledge of the SBPs allocated from table 1300, along with the information about the allocated sub-bands within the SBPs as indicated by the ITF and the MSB of the RIF, completes the allocation details for this embodiment.

For example, if RA field=00001011110 (i.e., RIF=0000101 and ITF=1110), then the 6 LSB of the RIF are 000101 (decimal value 5), which, from table 1300, maps to SBP[u]=0, SBP[v]=6. Hence, the allocated sub-bands are in SBP[0]={SB[0], SB[1]}, SBP[6]={SB[12], SB[13]} and SBP[10]={SB[20]}. The value of the ITF and the MSB of the RIF indicate that allocated sub-bands are the ones with the higher indices in SBP[0] and SBP[6]. Hence, the allocation is {SB[1], SB[13], SB[20]}.

In another embodiment, the decimal value of the 6 LSB bits of the 7-bit RIF corresponds to the pair of SBPs, {SBP[u], SBP[v]}, u≠v, u≠10, v≠10, as shown in Equation 6 below:

$$6\ LSB\ of\ RIF = \binom{u}{1} + \binom{v}{2}, u < v, \quad [\text{Eqn. 6}]$$

where the extended binomial coefficient for two integers n and k denoted as $$\binom{n}{k}$$

has been described earlier.

Figure 14:
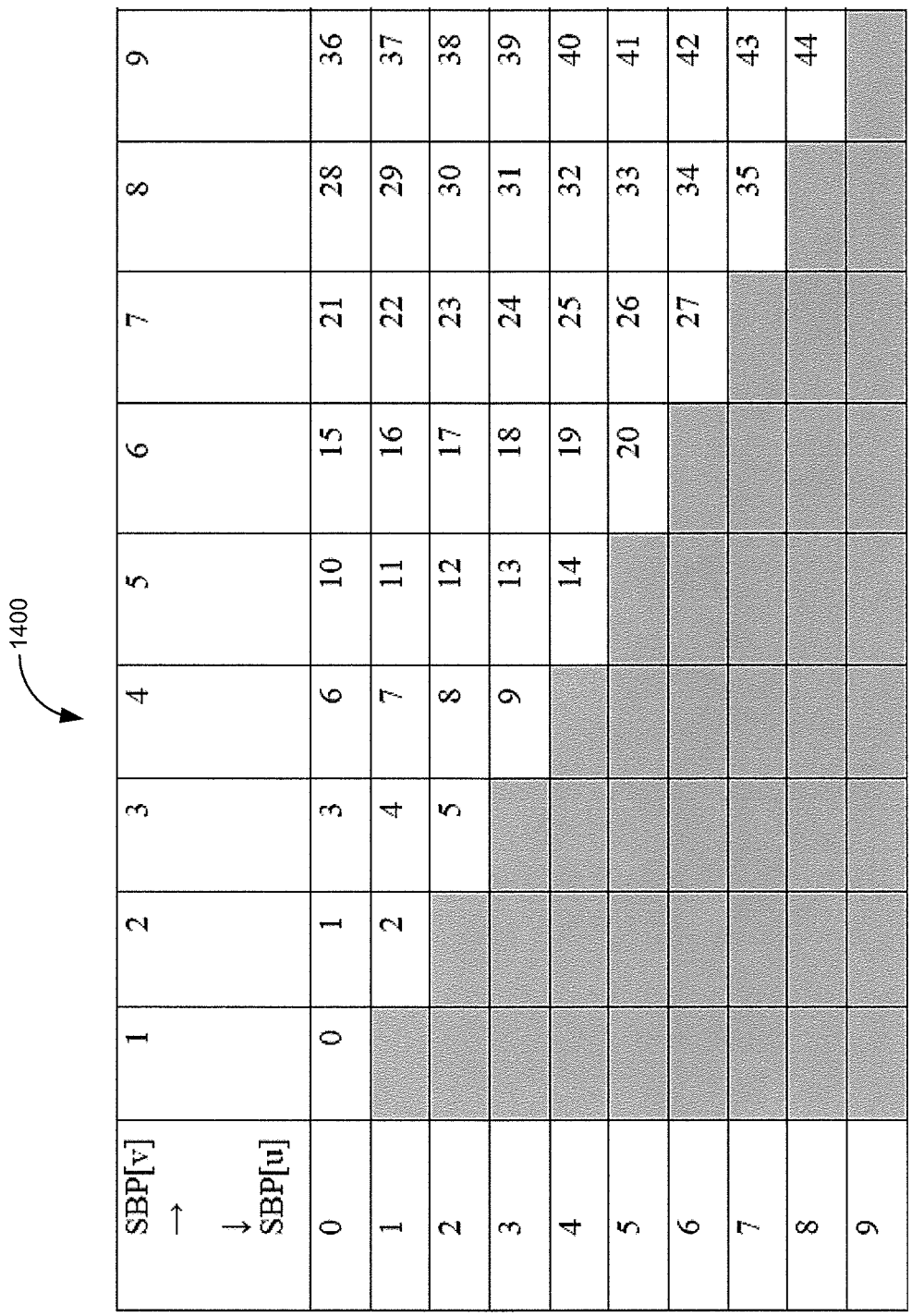
FIG. 14 illustrates a table generated by an extended binomial formula for translating a decimal value of a resource indexing field (RIF) to logical indices of three sub-band pairs according to a further embodiment of this disclosure.

FIG. 14 illustrates a table 1400 generated by an extended binomial formula for translating a decimal value of a resource indexing field (RIF) to three sub-band pairs according to a further embodiment of this disclosure.

The mapping of the value of the RIF to two SBPs, {SBP[u], SBP[v]}, u≠v, u≠10, v≠10, resulting from Equation 6 also may be depicted in table form as shown in table 1400 of FIG. 14. As with table 600, the shaded cells are not used to make interpretations. Knowledge of the SBPs allocated from table 1400, along with the information about the allocated sub-bands within the SBPs as indicated by the ITF and the MSB of the RIF as described with reference to FIG. 13, completes the allocation details for this particular embodiment.

Figure 15:
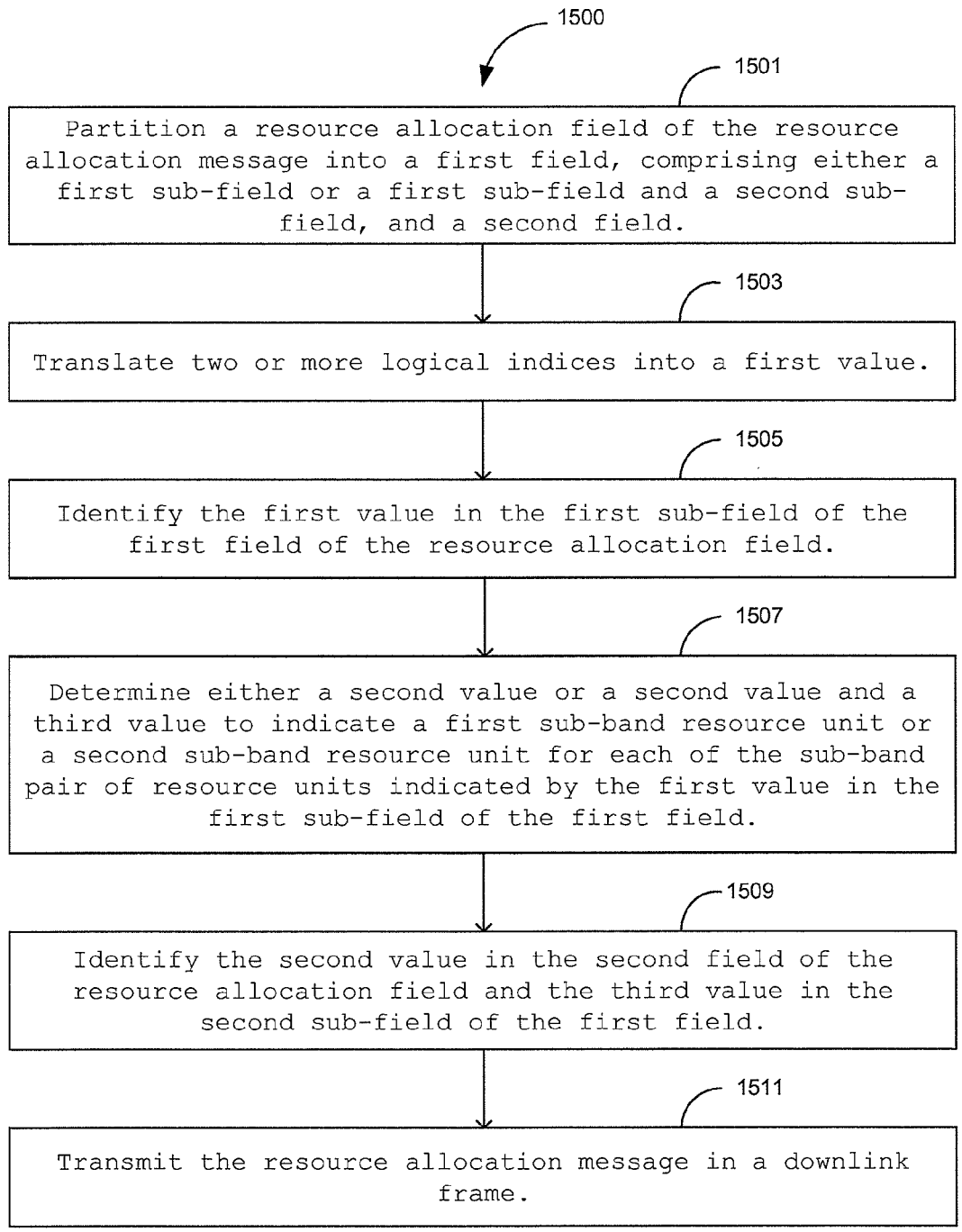
FIG. 15 illustrates a method of transmitting a resource allocation message in a base station.

FIG. 15 illustrates a method 1500 of transmitting a resource allocation message in a base station.

As shown in FIG. 15, method 1500 includes partitioning a resource allocation field of the resource allocation message into a first field, comprising either a first sub-field or a first sub-field and a second sub-field, and a second field (block 1501), and translating two or more logical indices into a first value (block 1503). Each of the two or more logical indices is associated with a sub-band pair of resource units, and the sub-band pair of resource units comprises either a first sub-band resource unit or a first sub-band resource unit and a second sub-band resource unit. Method 1500 also includes identifying the first value in the first sub-field of the first field of the resource allocation field (block 1505), and determining either a second value or a second value and a third value to indicate a first sub-band resource unit or a second sub-band resource unit for each of the sub-band pair of resource units indicated by the first value in the first sub-field of the first field (block 1507). Method 1500 further includes identifying the second value in the second field of the resource allocation field and the third value in the second sub-field of the first field (block 1509), and transmitting the resource allocation message in a downlink frame (block 1511).

Figure 16:
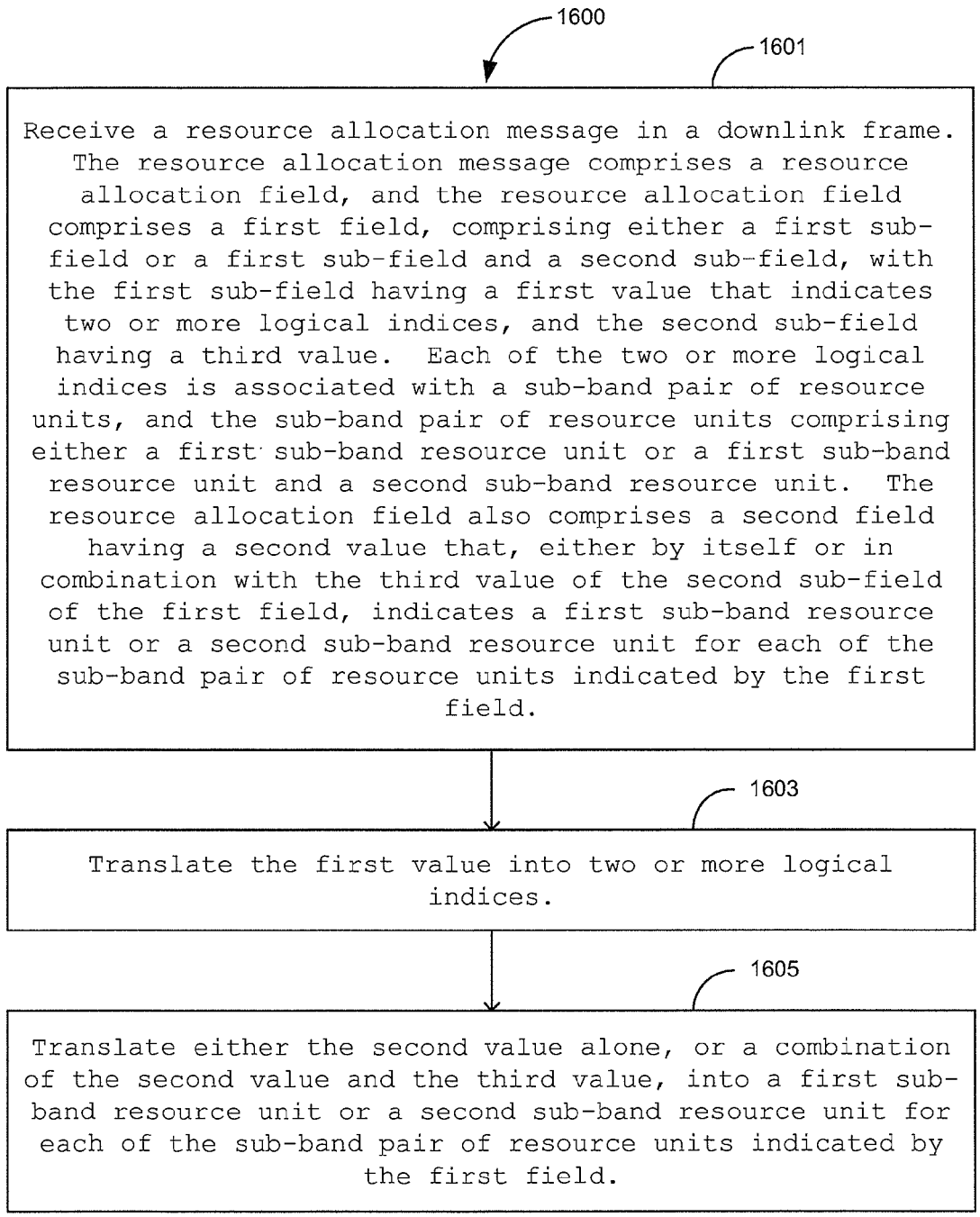
FIG. 16 illustrates a method of receiving a resource allocation message in a subscriber station.

FIG. 16 illustrates a method 1600 of receiving a resource allocation message in a subscriber station.

As shown in FIG. 16, method 1600 includes receiving a resource allocation message in a downlink frame (block 1601). The resource allocation message comprises a resource allocation field, and the resource allocation field comprises a first field, comprising either a first sub-field or a first sub-field and a second sub-field, with the first sub-field having a first value that indicates two or more logical indices, and the second sub-field having a third value. Each of the two or more logical indices is associated with a sub-band pair of resource units, and the sub-band pair of resource units comprising either a first sub-band resource unit or a first sub-band resource unit and a second sub-band resource unit. The resource allocation field also comprises a second field having a second value that, either by itself or in combination with the third value of the second sub-field of the first field, indicates a first sub-band resource unit or a second sub-band resource unit for each of the sub-band pair of resource units indicated by the first field. Method 1600 also includes translating the first value into two or more logical indices (block 1603). Each of the two or more logical indices is associated with a sub-band pair of resource units, and the sub-band pair of resource units comprises either a first sub-band resource unit or a first sub-band resource unit and a second sub-band resource unit. Method 1600 further includes translating either the second value alone, or a combination of the second value and the third value, into a first sub-band resource unit or a second sub-band resource unit for each of the sub-band pair of resource units indicated by the first field (block 1605).

In the disclosed embodiments of this disclosure, look-up tables were used to map the value of the RIF (or the value of part of the RIF) to certain SPBs and vice-versa. A particular decimal value of the RIF or portion of the RIF corresponded to the set of SBPs (and vice-versa) indicated by the table. However, one of ordinary skill in the art would recognize that alternative tables, different from the ones in the disclosed embodiments, may be developed and utilized without departing from the scope or spirit of this disclosure.

It may be noted that the assignment of a value of the ITF to a set of actions in the disclosed embodiments may be arbitrary, and one of ordinary skill in the art would recognize that any value may be utilized. Further embodiments may be derived by using a different mapping between the ITF values and the various embodiments, and this disclosure is understood to implicitly cover all such embodiments.

For example, a different table can be generated by simply incrementing each entry in table 600 of FIG. 6. For example, the entry in table 600 corresponding to the {SBP[0], SBP[1]} combination is 0. In an alternative table, that entry could be changed to 1, and similarly, the entries corresponding to other {SBP[u], SBP[v]} combinations could be simple increments of the corresponding entries in table 600. Generalizing this, an alternative table may be derived from 600 as follows: The entry corresponding to a certain set of SBPs in the alternative table is derived from the entry corresponding to the same set of SBPs in table 600 by performing some arbitrary transformation on the entry in table 600, while ensuring that each entry in that alternative table is distinct and unique. This disclosure is understood to implicitly cover all such embodiments.

Alternatively, the value of the RIF (or part of the RIF) that indicates a certain set of SBPs can be written in the form of a deterministic function of the SBPs. For example, table 600 can be described as follows: For any pair of SBPs {SBP[x], SBP[y]}, the corresponding RIF value is given by a function f_forward_lookup_Table_600(x, y), while for any RIF value r, the corresponding SBPs are given by {x, y}=f_reverse_lookup_Table_600(r). Then, the functions f_forward_lookup_Table_600( ) as well as f_reverse_lookup_Table_600( ) are specified by table 600 itself. As an example, f_forward_lookup_Table_600(0, 1)=0, while f_reverse_lookup_Table_600(0)={0, 1}. One may use some other functions to do the forward and reverse look-up in this case, i.e., one may have f_forward_lookup(x, y)=r, and f_reverse_lookup(x, y)=r, where f_forward_lookup( ) and f_reverse_lookup( ) are different from f_forward_lookup_Table_600( ) and f_reverse_lookup_Table_600( ). It may be noted that the use of such a functional approach can be mapped to an equivalent look-up table mapping SBPs to RIF values and vice-versa. This disclosure is understood to cover the use of such an alternative functional descriptions of the mapping between SBPs and RIF values as well.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting a resource allocation message in a base station, the method comprising:
    allocating a number of subbands to a terminal, wherein the number is two or more and the subbands are grouped in pairs; and
    transmitting the resource allocation message including a first information and a second information to the terminal,
    wherein the first information indicates at least one subband pair that includes one of the allocated subbands and the second information indicates the number of the allocated subbands and an index of the allocated subband within the subband pair, and
    wherein the second information comprises a 4-bit value between '0000' and '0011' when the number of the allocated subbands are 2 subbands and a 4-bit value between '0100 and '1111' when the number of the allocated subbands are 3 subbands.

2. The method of claim 1, wherein indices of the subband pairs and indices of the subbands are defined such that the subband pair with index j comprises at least one of a subband with index 2j and a subband with index (2j+1).

3. The method of claim 2, wherein the first information is based on at least one of a first subband pair index, a second subband pair index, and a third subband pair index.

4. The method of claim 3, wherein the second information indicates whether the index of the sub band is lower or higher in a subband pair.

5. The method of claim 4, wherein the first information comprises a 7-bit value.

6. The method of claim 1, wherein the first information includes a 7-bit value that is based on a value given by $$\binom{u}{1} + \binom{v}{2}, u < v,$$

where u is an index of the first subband pair and v is an index of the second subband pair, where $$\binom{n}{k} = \begin{cases} \binom{n}{k}, & n \geq k \\ 0, & n < k \end{cases},$$

and where $$\binom{n}{k} = \frac{n!}{k!(n-k)!}, n \geq k > 0$$

denotes the binomial coefficient of n and k.

7. The method of claim 6, wherein the 4-bit value comprises:
    '0000' when the index of a first subband is a lower subband index in the first subband pair and the index of a second subband is a lower subband index in the second subband pair,
    '0001' when the index of the first subband is a higher subband index in the first subband pair and the index of the second subband is a higher subband index in the second subband pair,
    '0010' when the index of the first subband is a lower subband index in the first subband pair and the index of the second subband is a higher subband index in the second subband pair, and
    '0011' when the index of the first subband is a higher subband index in the first subband pair and the index of the second subband is a lower subband index in the second subband pair.

8. The method of claim 1, wherein the first information is a 7-bit value that is based on a value given by $$\begin{cases} \binom{u}{1} + \binom{w}{2}, & u = v < w \\ \binom{w}{1} + \binom{u}{2} + 55, & w < u = v \end{cases},$$

where u is an index of the first subband pair, v is an index of the second subband pair and w is an index of the third subband pair, where $$\binom{n}{k} = \begin{cases} \binom{n}{k}, & n \geq k \\ 0, & n < k \end{cases},$$

and where $$\binom{n}{k} = \frac{n!}{k!(n-k)!}, n \geq k > 0$$

denotes the binomial coefficient of n and k.

9. The method of claim 8, wherein the 4-bit value of the second information comprises:
- '0100' when the index of an allocated subband is a lower subband index in the third subband pair, and
- '0101' when the index of the allocated subband is a higher subband index in the third subband pair.

10. The method of claim 1, wherein the first information comprises a 7-bit value that is based on a value given by $$\binom{u}{1} + \binom{v}{2} + \binom{w}{3}, u < v < w,$$

where u is an integer index of the first subband pair, v is an integer index of the second subband pair and w is an integer index of the third subband pair, where $$\binom{n}{k} = \begin{cases} \binom{n}{k}, & n \geq k \\ 0, & n < k \end{cases},$$

and where $$\binom{n}{k} = \frac{n!}{k!(n-k)!}, n \geq k > 0$$

denotes the binomial coefficient of n and k.

11. The method of claim 10, wherein the 4-bit value of the second information comprises:
- '0110' when the index of an allocated subband is a higher subband index in the first subband pair, the index of an allocated subband is a higher subband index in the second subband pair and the index of an allocated subband is a higher subband index in the third subband pair,
- '0111' when the index of the allocated subband is the higher subband index in the first subband pair, the index of the allocated subband is the higher subband index in the second subband pair, and the index of the allocated subband is a lower subband index in the third subband pair,
- '1000' when the index of the allocated subband is the higher subband index in the first subband pair, the index of the allocated subband is a lower subband index in the second subband pair and the index of the allocated subband is the higher subband index in the third subband pair,
- '1001' when the index of the allocated subband is the higher subband index in the first subband pair, the index of the allocated subband is the lower subband index in the second subband pair and the index of the allocated subband is the lower subband index in the third subband pair,
- '1010' when the index of the allocated subband is a lower subband index in the first subband pair, the index of the allocated subband is the higher subband index in the second subband pair and the index of the allocated subband is the higher subband index in the third subband pair,
- '1011' when the index of the allocated subband is the lower subband index in the first subband pair, the index of the allocated subband is the higher subband index in the second subband pair and the index of the allocated subband is the lower subband index in the third subband pair,
- '1100' when the index of the allocated subband is the lower subband index in the first subband pair, the index of the allocated subband is the lower subband index in the second subband pair and the index of the allocated subband is the higher subband index in the third subband pair, and
- '1101' when the index of the allocated subband is the lower subband index in the first subband pair, the index of the allocated subband is the lower subband index in the second subband pair and the index of the allocated subband is the lower subband index in the third subband pair.

12. The method of claim 1, wherein the first information comprises a 7-bit value, and 6 Least Significant Bits (LSBs) of the 7-bit value is based on a value given by $$\binom{u}{1} + \binom{v}{2}, u < v,$$

where u is an index of the first subband pair and v is an index of the second subband pair, where $$\binom{n}{k} = \begin{cases} \binom{n}{k}, & n \geq k \\ 0, & n < k \end{cases},$$

and where $$\binom{n}{k} = \frac{n!}{k!(n-k)!}, n \geq k > 0$$

denotes the binomial coefficient of n and k.

13. The method of claim 12, wherein a Most Significant Bit (MSB) of the 7-bit value comprises:
- '0' when the index of an allocated subband is a higher subband index in the first subband pair, and
- '1' when the index of an allocated subband is a lower subband index in the first subband pair, and wherein the 4-bit value of the second information comprises:
- '1110' when an index of an allocated subband in the first subband pair and an index of an allocated subband in the second subband pair are both a higher subband indices in the first subband pair and the second subband pair or both a lower indices in the first subband pair and the second subband pair, and
- '1111' when either the index of the allocated subband in the first subband pair is the higher subband index in the first subband pair and the index of the allocated subband in the second subband pair is the lower subband index in the second subband pair, or, the index of the allocated subband in the first subband pair is the lower subband index in the first subband pair and the index of the allocated subband in the second subband pair is the higher subband index in the second subband pair.

14. A method for receiving a resource allocation message in a terminal, the method comprising:

receiving the resource allocation message including a first information and a second information from a base station; and identifying a number of subbands allocated to the terminal using the first information and the second information, wherein the number is two or more and the subbands are grouped in pairs, wherein the first information indicates at least one subband pair that includes the allocated subband and the second information indicates the number of the allocated subbands and an index of the allocated subband within the subband pair, and wherein the second information comprises a 4-bit value between '0000' and '0011' when the number of the allocated subbands are 2 subbands and a 4-bit value between '0100 and '1111' when the number of the allocated subbands are 3 subbands.

15. The method of claim 14, wherein indices of the subband pairs and indices of the subbands are defined such that the subband pair with index j comprises at least one of a subband with index 2j and a subband with index (2j+1).

16. The method of claim 15, wherein the first information is based on at least one of a first subband pair index, a second subband pair index, and a third subband pair index.

17. The method of claim 16, wherein the second information indicates whether the index of subband is lower or higher in a subband pair.

18. The method of claim 17, wherein the first information comprises a 7-bit value.

19. The method of claim 14, wherein the first information comprises a 7-bit value that is based on a value given by $$\binom{u}{1} + \binom{v}{2} + \binom{w}{3}, u < v < w,$$

where u is an integer index of the first subband pair, v is an integer index of the second subband pair and w is an integer index of the third subband pair, where $$\left\{ \begin{matrix} n \\ k \end{matrix} \right\} = \begin{cases} \binom{n}{k}, & n \geq k \\ 0, & n < k \end{cases},$$

and where $$\binom{n}{k} = \frac{n!}{k!(n-k)!}, n \geq k > 0$$

denotes the binomial coefficient of n and k.

20. The method of claim 19, wherein the 4-bit value comprises:

'0000' when the index of a first subband is a lower subband index in the first subband pair and the index of a second subband is a lower subband index in the second subband pair, '0001' when the index of the first subband is a higher subband index in the first subband pair and the index of the second subband is a higher subband index in the second subband pair, '0010' when the index of the first subband is a lower subband index in the first subband pair and the index of the second subband is a higher subband index in the second subband pair, and '0011' when the index of the first subband is a higher subband index in the first subband pair and the index of the second subband is a lower subband index in the second subband pair.

21. The method of claim 14, wherein the first information comprises a 7-bit value that is based on a value given by $$\begin{cases} \binom{u}{1} + \binom{w}{2}, & u = v < w \\ \binom{w}{1} + \binom{u}{2} + 55, & w < u = v \end{cases},$$

where u is an index of the first subband pair, v is an index of the second subband pair and w is an index of the third subband pair, where $$\left\{ \begin{matrix} n \\ k \end{matrix} \right\} = \begin{cases} \binom{n}{k}, & n \geq k \\ 0, & n < k \end{cases},$$

and where $$\binom{n}{k} = \frac{n!}{k!(n-k)!}, n \geq k > 0$$

denotes the binomial coefficient of n and k.

22. The method of claim 21, wherein the 4-bit value of the second information comprises:

'0100' when the index of an allocated subband is a lower subband index in the third subband pair, and '0101' when the index of the allocated subband is a higher subband index in the third subband pair.

23. The method of claim 14, wherein the first information is a 7-bit value that is based on a value given by $$\binom{u}{1} + \binom{v}{2} + \binom{w}{3}, u < v < w,$$

where u is an integer index of the first subband pair, v is an integer index of the second subband pair and w is an integer index of the third subband pair, where $$\left\{ \begin{matrix} n \\ k \end{matrix} \right\} = \begin{cases} \binom{n}{k}, & n \geq k \\ 0, & n < k \end{cases},$$

and where $$\binom{n}{k} = \frac{n!}{k!(n-k)!}, n \geq k > 0$$

denotes the binomial coefficient of n and k.

24. The method of claim 23, wherein the 4-bit value of the second information comprises:

'0110' when the index of an allocated subband is a higher subband index in the first subband pair, the index of an allocated subband is a higher subband index in the second subband pair and the index of an allocated subband is a higher subband index in the third subband pair, '0111' when the index of the allocated subband is the higher subband index in the first subband pair, the index of the allocated subband is the higher subband index in the second subband pair and the index of the allocated subband is a lower subband index in the third subband pair, '1000' when the index of the allocated subband is the higher subband index in the first subband pair, the index of the allocated subband is a lower subband index in the second subband pair and the index of the allocated subband is the higher subband index in the third subband pair, '1001' when the index of the allocated subband is the higher subband index in the first subband pair, the index of the allocated subband is the lower subband index in the second subband pair and the index of the allocated subband is the lower subband index in the third subband pair, '1010' when the index of the allocated subband is a lower subband index in the first subband pair, the index of the allocated subband is the higher subband index in the second subband pair and the index of the allocated subband is the higher subband index in the third subband pair, '1011' when the index of the allocated subband is the lower subband index in the first subband pair, the index of the allocated subband is the higher subband index in the second subband pair and the index of the allocated subband is the lower subband index in the third subband pair, '1100' when the index of the allocated subband is the lower subband index in the first subband pair, the index of the allocated subband is the lower subband index in the second subband pair and the index of the allocated subband is the higher subband index in the third subband pair, and '1101' when the index of the allocated subband is the lower subband index in the first subband pair, the index of the allocated subband is the lower subband index in the second subband pair and the index of the allocated subband is the lower subband index in the third subband pair.

25. The method of claim 14, wherein the first information is a 7-bit value, and 6 Least Significant Bits (LSBs) of the 7-bit value is based on a value given by $$\binom{u}{1} + \binom{v}{2}, u < v,$$

where u is an index of the first subband pair and v is an index of the second subband pair, where $$\genfrac{\{}{\}}{0pt}{}{n}{k} = \begin{cases} \binom{n}{k}, & n \geq k \\ 0, & n < k \end{cases},$$

and where $$\binom{n}{k} = \frac{n!}{k!(n-k)!}, n \geq k > 0$$

denotes the binomial coefficient of n and k.

26. The method of claim 25, wherein a Most Significant Bit (MSB) of the 7-bit value comprises:
'0' when the index of an allocated subband is a higher subband index in the first subband pair, and
'1' when the index of an allocated subband is a lower subband index in the first subband pair, and
wherein the 4-bit value of the second information comprises:
'1110' when an index of an allocated subband in the first subband pair and an index of an allocated subband in the second subband pair are both a higher subband indices in the first subband pair and the second subband pair or both a lower indices in the first subband pair and the second subband pair, and
'1111' when either the index of the allocated subband in the first subband pair is the higher subband index in the first subband pair and the index of the allocated subband in the second subband pair is the lower subband index in the second subband pair, or, the index of the allocated subband in the first subband pair is the lower subband index in the first subband pair and the index of the allocated subband in the second subband pair is the higher subband index in the second subband pair.

27. An apparatus for transmitting a resource allocation message in a base station, the apparatus comprising:
a controller, comprising hardware, the controller configured to allocate a number of subbands to a terminal, wherein the number is two or more and the subbands are grouped in pairs; and
a transmitter configured to transmit the resource allocation message including a first information and a second information to the terminal,
wherein the first information is configured to indicate at least one subband pair that includes the allocated subband and the second information indicates the number of the allocated subbands and an index of the allocated subband within the subband pair, and
wherein the second information comprises a 4-bit value between '0000' and '0011' when the number of the allocated subbands are 2 subbands and a 4-bit value between '0100' and '1111' when the number of the allocated subbands are 3 subbands.

28. The apparatus of claim 27, wherein indices of the subband pairs and indices of the subbands are defined such that the subband pair with index j comprises at least one of a subband with index 2j and a subband with index (2j+1).

29. The apparatus of claim 28, wherein the first information is based on at least one of a first subband pair index, a second subband pair index, and a third subband pair index.

30. The apparatus of claim 29, wherein the second information indicates whether the index of subband is lower or higher in a subband pair.

31. The apparatus of claim 30, wherein the first information comprises a 7-bit value.

32. The apparatus of claim 27, wherein the first information comprises a 7-bit value that is based on a value given by $$\binom{u}{1} + \binom{v}{2}, u < v,$$

where u is an index of the first subband pair and v is an index of the second subband pair, where $$\left\langle {n \atop k} \right\rangle = \begin{cases} \binom{n}{k}, & n \geq k \\ 0, & n < k \end{cases},$$

and where $$\binom{n}{k} = \frac{n!}{k!(n-k)!}, n \geq k > 0$$

denotes the binomial coefficient of n and k.

33. The apparatus of claim 32, wherein the 4-bit value comprises:
   '0000' when the index of a first subband is a lower subband index in the first subband pair and the index of a second subband is a lower subband index in the second subband pair,
   '0001' when the index of the first subband is a higher subband index in the first subband pair and the index of the second subband is a higher subband index in the second subband pair,
   '0010' when the index of the first subband is a lower subband index in the first subband pair and the index of the second subband is a higher subband index in the second subband pair, and
   '0011' when the index of the first subband is a higher subband index in the first subband pair and the index of the second subband is a lower subband index in the second subband pair.

34. The apparatus of claim 27, wherein the first information comprises a 7-bit value that is based on a value given by $$\begin{cases} \left\langle {u \atop 1} \right\rangle + \left\langle {w \atop 2} \right\rangle, & u = v < w \\ \left\langle {w \atop 1} \right\rangle + \left\langle {u \atop 2} \right\rangle + 55, & w < u = v \end{cases},$$

where u is an index of the first subband pair, v is an index of the second subband pair and w is an index of the third subband pair, where $$\left\langle {n \atop k} \right\rangle = \begin{cases} \binom{n}{k}, & n \geq k \\ 0, & n < k \end{cases},$$

and where $$\binom{n}{k} = \frac{n!}{k!(n-k)!}, n \geq k > 0$$

denotes the binomial coefficient of n and k.

35. The apparatus of claim 34, wherein the 4-bit value of the second information comprises:
   '0100' when the index of an allocated subband is a lower subband index in the third subband pair, and
   '0101' when the index of the allocated subband is a higher subband index in the third subband pair.

36. The apparatus of claim 27, wherein the first information is a 7-bit value that is based on a value given by $$\left\langle {u \atop 1} \right\rangle + \left\langle {v \atop 2} \right\rangle + \left\langle {w \atop 3} \right\rangle, u < v < w,$$

where u is an integer index of the first subband pair, v is an integer index of the second subband pair and w is an integer index of the third subband pair, where $$\left\langle {n \atop k} \right\rangle = \begin{cases} \binom{n}{k}, & n \geq k \\ 0, & n < k \end{cases},$$

and where $$\binom{n}{k} = \frac{n!}{k!(n-k)!}, n \geq k > 0$$

denotes the binomial coefficient of n and k.

37. The apparatus of claim 36, wherein the 4-bit value of the second information comprises:
   '0110' when the index of an allocated subband is a higher subband index in the first subband pair, the index of an allocated subband is a higher subband index in the second subband pair and the index of an allocated subband is a higher subband index in the third subband pair,
   '0111' when the index of the allocated subband is the higher subband index in the first subband pair, the index of the allocated subband is the higher subband index in the second subband pair and the index of the allocated subband is a lower subband index in the third subband pair,
   '1000' when the index of the allocated subband is the higher subband index in the first subband pair, the index of the allocated subband is a lower subband index in the second subband pair and the index of the allocated subband is the higher subband index in the third subband pair,
   '1001' when the index of the allocated subband is the higher subband index in the first subband pair, the index of the allocated subband is the lower subband index in the second subband pair and the index of the allocated subband is the lower subband index in the third subband pair,
   '1010' when the index of the allocated subband is a lower subband index in the first subband pair, the index of the allocated subband is the higher subband index in the second subband pair and the index of the allocated subband is the higher subband index in the third subband pair,
   '1011' when the index of the allocated subband is the lower subband index in the first subband pair, the index of the allocated subband is the higher subband index in the second subband pair and the index of the allocated subband is the lower subband index in the third subband pair, '1100' when the index of the allocated subband is the lower subband index in the first subband pair, the index of the allocated subband is the lower subband index in the second subband pair and the index of the allocated subband is the higher subband index in the third subband pair, and '1101' when the index of the allocated subband is the lower subband index in the first subband pair, the index of the allocated subband is the lower subband index in the second subband pair and the index of the allocated subband is the lower subband index in the third subband pair.

38. The apparatus of claim 27, wherein the first information comprises a 7-bit value, and 6 Least Significant Bits (LSBs) of the 7-bit value is based on a value given by $$\left\{ \begin{matrix} u \\ 1 \end{matrix} \right\} + \left\{ \begin{matrix} v \\ 2 \end{matrix} \right\}, u < v,$$

where u is an index of the first subband pair and v is an index of the second subband pair, where $$\left\{ \begin{matrix} n \\ k \end{matrix} \right\} = \begin{cases} \begin{pmatrix} n \\ k \end{pmatrix}, & n \geq k \\ 0, & n < k \end{cases},$$

and where $$\begin{pmatrix} n \\ k \end{pmatrix} = \frac{n!}{k!(n-k)!}, n \geq k > 0$$

denotes the binomial coefficient of n and k.

39. The apparatus of claim 38, wherein a Most Significant Bit (MSB) of the 7-bit value comprises:
 '0' when the index of an allocated subband is a higher subband index in the first subband pair, and
 '1' when the index of an allocated subband is a lower subband index in the first subband pair, and
wherein the 4-bit value of the second information comprises:
 '1110' when an index of an allocated subband in the first subband pair and an index of an allocated subband in the second subband pair are both a higher subband indices in the first subband pair and the second subband pair or both a lower indices in the first subband pair and the second subband pair, and
 '1111' when either the index of the allocated subband in the first subband pair is the higher subband index in the first subband pair and the index of the allocated subband in the second subband pair is the lower subband index in the second subband pair, or, the index of the allocated subband in the first subband pair is the lower subband index in the first subband pair and the index of the allocated subband in the second subband pair is the higher subband index in the second subband pair.

40. An apparatus for receiving a resource allocation message in a terminal, the apparatus comprising:
 a receiver configured to receive the resource allocation message including a first information and a second information from a base station; and
 a controller, comprising hardware, the controller configured to identify a number of subbands allocated to the terminal using the first information and the second information, wherein the number is two or more and the subbands are grouped in pairs,
 wherein the first information is configured to indicate at least one subband pair that includes the allocated subband and the second information indicates the number of the allocated subbands and an index of the allocated subband within the subband pair, and
 wherein the second information comprises a 4-bit value between '0000' and '0011' when the number of the allocated subbands are 2 subbands and a 4-bit value between '0100 and '1111' when the number of the allocated subbands comprises 3 subbands.

41. The apparatus of claim 40, wherein indices of the subband pairs and indices of the subbands are defined such that the subband pair with index j comprises at least one of a subband with index 2j and a subband with index (2j+1).

42. The apparatus of claim 41, wherein the first information is based on at least one of a first subband pair index, a second subband pair index, and a third subband pair index.

43. The apparatus of claim 42, wherein the second information indicates whether the index of subband is lower or higher in a subband pair.

44. The apparatus of claim 43, wherein the first information comprises a 7-bit value.

45. The apparatus of claim 40, wherein the first information comprises a 7-bit value that is based on a value given by $$\left\{ \begin{matrix} u \\ 1 \end{matrix} \right\} + \left\{ \begin{matrix} v \\ 2 \end{matrix} \right\}, u < v,$$

where u is an index of the first subband pair and v is an index of the second subband pair, where $$\left\{ \begin{matrix} n \\ k \end{matrix} \right\} = \begin{cases} \begin{pmatrix} n \\ k \end{pmatrix}, & n \geq k \\ 0, & n < k \end{cases},$$

and where $$\begin{pmatrix} n \\ k \end{pmatrix} = \frac{n!}{k!(n-k)!}, n \geq k > 0$$

denotes the binomial coefficient of n and k.

46. The apparatus of claim 45, wherein the 4-bit value comprises:
 '0000' when the index of a first subband is a lower subband index in the first subband pair and the index of a second subband is a lower subband index in the second subband pair,
 '0001' when the index of the first subband is a higher subband index in the first subband pair and the index of the second subband is a higher subband index in the second subband pair,
 '0010' when the index of the first subband is a lower subband index in the first subband pair and the index of the second subband is a higher subband index in the second subband pair, and '0011' when the index of the first subband is a higher subband index in the first subband pair and the index of the second subband is a lower subband index in the second subband pair.

47. The apparatus of claim 40, wherein the first information comprises a 7-bit value that is based on a value given by $$\begin{cases} \binom{u}{1} + \binom{w}{2}, & u = v < w \\ \binom{w}{1} + \binom{u}{2} + 55, & w < u = v \end{cases},$$

where u is an index of the first subband pair, v is an index of the second subband pair and w is an index of the third subband pair, where $$\binom{n}{k} = \begin{cases} \binom{n}{k}, & n \geq k \\ 0, & n < k \end{cases},$$

and where $$\binom{n}{k} = \frac{n!}{k!(n-k)!}, n \geq k > 0$$

denotes the binomial coefficient of n and k.

48. The apparatus of claim 46, wherein the 4-bit value of the second information comprises:
    '0100' when the index of an allocated subband is a lower subband index in the third subband pair, and
    '0101' when the index of the allocated subband is a higher subband index in the third subband pair.

49. The apparatus of claim 40, wherein the first information is a 7-bit value that is based on a value given by $$\binom{u}{1} + \binom{v}{2} + \binom{w}{3}, u < v < w,$$

where u is an integer index of the first subband pair, v is an integer index of the second subband pair and w is an integer index of the third subband pair, where $$\binom{n}{k} = \begin{cases} \binom{n}{k}, & n \geq k \\ 0, & n < k \end{cases},$$

and where $$\binom{n}{k} = \frac{n!}{k!(n-k)!}, n \geq k > 0$$

denotes the binomial coefficient of n and k.

50. The apparatus of claim 49, wherein the 4-bit value of the second information comprises:
    '0110' when the index of an allocated subband is a higher subband index in the first subband pair, the index of an allocated subband is a higher subband index in the second subband pair and the index of an allocated subband is a higher subband index in the third subband pair,
    '0111' when the index of the allocated subband is the higher subband index in the first subband pair, the index of the allocated subband is the higher subband index in the second subband pair and the index of the allocated subband is a lower subband index in the third subband pair,
    '1000' when the index of the allocated subband is the higher subband index in the first subband pair, the index of the allocated subband is a lower subband index in the second subband pair and the index of the allocated subband is the higher subband index in the third subband pair,
    '1001' when the index of the allocated subband is the higher subband index in the first subband pair, the index of the allocated subband is the lower subband index in the second subband pair and the index of the allocated subband is the lower subband index in the third subband pair,
    '1010' when the index of the allocated subband is a lower subband index in the first subband pair, the index of the allocated subband is the higher subband index in the second subband pair and the index of the allocated subband is the higher subband index in the third subband pair,
    '1011' when the index of the allocated subband is the lower subband index in the first subband pair, the index of the allocated subband is the higher subband index in the second subband pair and the index of the allocated subband is the lower subband index in the third subband pair,
    '1100' when the index of the allocated subband is the lower sub band index in the first subband pair, the index of the allocated subband is the lower subband index in the second subband pair and the index of the allocated subband is the higher subband index in the third subband pair, and
    '1101' when the index of the allocated subband is the lower subband index in the first sub band pair, the index of the allocated subband is the lower subband index in the second subband pair and the index of the allocated subband is the lower subband index in the third subband pair.

51. The apparatus of claim 40, wherein the first information comprises a 7-bit value, and 6 Least Significant Bits (LSBs) of the 7-bit value is based on a value given by $$\binom{u}{1} + \binom{v}{2}, u < v,$$

where u is an index of the first subband pair and v is an index of the second subband pair, where $$\binom{n}{k} = \begin{cases} \binom{n}{k}, & n \geq k \\ 0, & n < k \end{cases},$$

and where $$\binom{n}{k} = \frac{n!}{k!(n-k)!}, n \geq k > 0$$

denotes the binomial coefficient of n and k.

52. The apparatus of claim 51, wherein a Most Significant Bit (MSB) of the 7-bit value comprises:
- '0' when the index of an allocated subband is a higher subband index in the first subband pair, and
- '1' when the index of an allocated subband is a lower subband index in the first subband pair, and
- wherein the 4-bit value of the second information comprises:
- '1110' when an index of an allocated subband in the first subband pair and an index of an allocated subband in the second subband pair are both a higher subband indices in the first subband pair and the second subband pair or both a lower indices in the first subband pair and the second subband pair, and
- '1111' when either the index of the allocated subband in the first subband pair is the higher subband index in the first subband pair and the index of the allocated subband in the second subband pair is the lower subband index in the second subband pair, or, the index of the allocated subband in the first subband pair is the lower subband index in the first subband pair and the index of the allocated subband in the second subband pair is the higher subband index in the second subband pair.

* * * * *